(12) United States Patent
Saito

(10) Patent No.: US 6,741,991 B2
(45) Date of Patent: May 25, 2004

(54) DATA MANAGEMENT SYSTEM

(75) Inventor: Makoto Saito, Tokyo (JP)

(73) Assignee: Mitsubishi Corporation, Tokyo (JP)

( * ) Notice: Subject to any disclaimer, the term of this patent is extended or adjusted under 35 U.S.C. 154(b) by 0 days.

(21) Appl. No.: 09/985,376

(22) Filed: Nov. 2, 2001

(65) Prior Publication Data

US 2002/0059238 A1 May 16, 2002

Related U.S. Application Data

(63) Continuation of application No. 09/362,955, filed on Jul. 30, 1999, which is a division of application No. 08/825,868, filed on Apr. 2, 1997, now Pat. No. 6,002,772, which is a continuation-in-part of application No. 08/536,747, filed on Sep. 29, 1995, now Pat. No. 6,069,952, and a continuation-in-part of application No. 09/549,270, filed on Oct. 27, 1995, now abandoned.

(30) Foreign Application Priority Data

| Sep. 30, 1994 | (JP) | ............................................ 6-237673 |
| Oct. 27, 1994 | (JP) | ............................................ 6-264199 |
| Oct. 27, 1994 | (JP) | ............................................ 6-264200 |
| Nov. 2, 1994 | (JP) | ............................................ 6-269959 |
| Dec. 2, 1994 | (JP) | ............................................ 6-299835 |

(51) Int. Cl.$^7$ ......................... G06F 17/30; H04K 7/167
(52) U.S. Cl. ........................... 707/9; 380/239; 380/228
(58) Field of Search ........................... 707/9–10, 101, 707/500; 713/161–162, 168–170, 184–191; 380/239, 228, 258–260, 277–286, 44–45; 715/500.1

(56) References Cited

U.S. PATENT DOCUMENTS 4,168,396 A    9/1979 Best (List continued on next page.)

FOREIGN PATENT DOCUMENTS

| EP | 0 121 853 A3 | 10/1984 |
| EP | 0 191 162 A2 | 8/1986 |

(List continued on next page.)

OTHER PUBLICATIONS

Medvinsky, et al. Net Cash: A Design for Practical Erectrical Currency on the Internet, ISI Reprint Series, Nov. 1993, pp. 2–7.

(List continued on next page.)

*Primary Examiner*—Alford Kindred
(74) *Attorney, Agent, or Firm*—Westerman, Hattori, Daniels & Adrian, LLP

(57) ABSTRACT

To prevent piracy or leakage of data content, a cryptography technique and electronic watermark technique are combined together and used. In a data content supplied to a user, a user data is entered as electronic watermark by a data management center, and the data content with an electronic watermark entered in it is encrypted using a crypt key and is supplied. The encrypted data content is decrypted using a crypt key distributed from the data management center and is used. In case it is to be stored, it is encrypted using another crypt key. In case the data content is copied and transferred to other user, a user data of the other user is entered as electronic watermark, and a scenario to enter the user data of the other user as electronic watermark is registered at the data management center, and the data content with electronic watermark entered in it is encrypted using another crypt key and is supplied. When the validity of the other user is confirmed by the scenario, another crypt key is distributed to the other user. The encrypted data content is decrypted using another crypt key and is used. When it is to be stored, it is encrypted using still another key. In case the data content has been copied and transferred illegitimately, it is possible by verifying the electronic watermark to identify the user who has copied and transferred the data content illegitimately.

94 Claims, 5 Drawing Sheets

U.S. PATENT DOCUMENTS

| | | |
|---|---|---|
| 4,278,837 A | 7/1981 | Best |
| 4,352,952 A | 10/1982 | Boone |
| 4,465,901 A | 8/1984 | Best |
| 4,558,176 A | 12/1985 | Arnold |
| 4,588,991 A | 5/1986 | Atalla |
| 4,709,266 A | 11/1987 | Hanas |
| 4,864,494 A | 9/1989 | Kobus |
| 4,890,319 A | 12/1989 | Seth-Smith |
| 4,905,277 A | 2/1990 | Nakamura |
| 4,919,545 A | 4/1990 | Yu |
| 5,036,461 A | 7/1991 | Elliott |
| 5,083,309 A | 1/1992 | Beysson |
| 5,126,566 A | 6/1992 | Shimada |
| 5,138,659 A | 8/1992 | Kelkar et al. |
| 5,146,497 A | 9/1992 | Bright |
| 5,173,939 A | 12/1992 | Abadi |
| 5,220,604 A | 6/1993 | Gasser |
| 5,224,163 A | 6/1993 | Gasser |
| 5,291,598 A | 3/1994 | Grundy |
| 5,301,245 A | 4/1994 | Endoh |
| 5,315,657 A | 5/1994 | Abadi |
| 5,319,705 A | 6/1994 | Halter et al. |
| 5,347,581 A | 9/1994 | Naccache |
| 5,349,662 A | 9/1994 | Johnson |
| 5,353,351 A | 10/1994 | Bartoli |
| 5,369,702 A | 11/1994 | Shanton |
| 5,381,480 A | 1/1995 | Butter |
| 5,400,403 A | 3/1995 | Fahn |
| 5,410,602 A | 4/1995 | Finkelstein |
| 5,414,772 A | 5/1995 | Naccache |
| 5,428,685 A | 6/1995 | Kadooka |
| 5,438,508 A | 8/1995 | Wyman |
| 5,444,782 A | 8/1995 | Adams |
| 5,453,601 A | 9/1995 | Rosen |
| 5,455,863 A | 10/1995 | Brown et al. ................. 380/23 |
| 5,455,941 A | 10/1995 | Okuno et al. ............... 395/600 |
| 5,457,746 A | 10/1995 | Dolphin |
| 5,465,299 A | 11/1995 | Matsumoto et al. .......... 380/23 |
| 5,475,757 A | 12/1995 | Kelly |
| 5,479,514 A | 12/1995 | Klonowski |
| 5,495,533 A | 2/1996 | Linehan |
| 5,504,816 A | 4/1996 | Hamilton et al. |
| 5,504,817 A | 4/1996 | Shamir |
| 5,504,818 A | 4/1996 | Okano |
| 5,509,074 A | 4/1996 | Choudhury |
| 5,511,121 A | 4/1996 | Yacobi |
| 5,515,441 A | 5/1996 | Faucher |
| 5,577,121 A | 11/1996 | Davis |
| 5,584,023 A | 12/1996 | Hsu |
| 5,606,609 A * | 2/1997 | Houser et al. .............. 713/179 |
| 5,633,934 A | 5/1997 | Hember |
| 5,636,277 A | 6/1997 | Nagahama |
| 5,646,999 A | 7/1997 | Saito ........................... 380/25 |
| 5,651,064 A | 7/1997 | Newell |
| 5,666,411 A | 9/1997 | McCarty |
| 5,680,452 A | 10/1997 | Shanton |
| 5,706,210 A | 1/1998 | Kumano |
| 5,715,393 A | 2/1998 | Naugle |
| 5,765,152 A | 6/1998 | Erickson |
| 5,771,383 A | 6/1998 | Magee |
| 5,812,762 A | 9/1998 | Kim |
| 5,832,083 A | 11/1998 | Iwayama et al. |
| 5,848,158 A | 12/1998 | Saito ........................... 380/21 |
| 5,867,579 A | 2/1999 | Saito |
| 5,986,690 A | 11/1999 | Hendricks |
| 6,069,952 A | 5/2000 | Saito |
| 6,081,794 A | 6/2000 | Saito |
| 6,128,605 A | 10/2000 | Saito |
| 6,160,891 A | 12/2000 | Al-Salqan |

FOREIGN PATENT DOCUMENTS

| | | |
|---|---|---|
| EP | 0 391 261 A2 | 10/1990 |
| EP | 0421 808 A2 | 4/1991 |
| EP | 0 518 365 A2 | 12/1992 |
| EP | 0 542 298 A2 | 5/1993 |
| EP | 0 665 486 A2 | 8/1995 |
| EP | 0 430 734 | 9/1995 |
| EP | 0 677 949 A2 | 10/1995 |
| EP | 0704 7785 A2 | 4/1996 |
| EP | 0 709 760 A2 | 5/1996 |
| EP | 0 715 241 A2 | 6/1996 |
| EP | 0 354 774 B1 | 10/1996 |
| JP | 05-334324 | 12/1983 |
| JP | 64-061782 | 3/1989 |
| JP | 05-075597 | 3/1993 |
| JP | 5-122701 | 5/1993 |
| JP | 05-324936 | 12/1993 |
| JP | 06-131806 | 5/1994 |
| JP | 06-236147 | 8/1994 |
| JP | 06-290087 | 10/1994 |
| JP | 06-318036 | 11/1994 |
| JP | 2546983 | 8/1996 |
| WO | WO 90 02382 | 3/1990 |
| WO | WO 96/23257 | 8/1996 |

OTHER PUBLICATIONS

Newman, Proceedings of the 13th International Conference on Distributed Computing Systems, May 1993, pp. 283–291.

Harn, L. et al. "A software authentication system for information . . . " Computers & Security International Journal vol. II, No. 8, Dec. 1, 1992, PP 747–752, xp000332279.

F. Masuoka, "Progressing Flash Momories," Kogyo Chosakai Co. pp34–68 (1992) (English translation of underlined portions only).

R. Adachi, "Introduction to Handcraft of Personal Computer," Natsume Publishing Co., pp 141–155 (1983) (English translation of underlined portions only).

H. Morizaki, "Introduction to Electronic Devices," Gijutsu Hyron Publishing Co., pp 260–266 (1989) (English translation of underlined portions only).

Wayner, Digital Copyright Protection, AP Professional, 1997.

U.S. FIPS Publication 81 DES Modes of Operation, Dec. 2, 1980.

Saterite and Cable TV Scramling and Descrambling, Baylin/Gale Productions, 2nd Edition, 1986, pp 163–165.

Lennil, p. "The IBM Microkernel Technology," OS/2 Developer, vol. 5, Nov. 1, 1993 (pp 70–72, 74) XP000672962.

Notice of Rejection mailed Oct. 15, 2002 from the Japanese Patent Office in related Application No. 7–228366 and partitial translation thereof.

Communication from European Patent Office, Mitsubishi Corp. Dec. 12, 1998.

Gale, B. and Baylin F., Scrambling and Descrambling, Satellite and Cable TV 2nd Ed, Baylin/Gale Productions 1986 Boulder CO; pp. 163–165.

* cited by examiner

DATA MANAGEMENT SYSTEM

CROSS-REFERENCE TO RELATED APPLICATIONS

This application is a continuation of prior application Ser. No. 09/362,955 filed Jul. 30, 1999, which is a Division of prior application Ser. No. 08/825,868, filed Apr. 2, 1997 (now U.S. Pat. No. 6,002,772), which is a CIP of prior application Ser. No. 08/536,747, filed Sep. 29, 1995, now U.S. Pat. No. 6,069,952 and Ser. No. 08/549,270, filed Oct. 27, 1995, now ABN.

BACKGROUND OF THE INVENTION

1. Field of the Invention

The present invention relates to a system for managing data for using, i.e., storing, copying, editing, or transferring digital data content.

2. Background Art

Because analog data content is deteriorated in quality whenever storing, copying, editing, or transferring it, controlling copyrights associated with these operations has not been a serious problem. However, because digital data content is not deteriorated in quality after repeatedly storing, copying, editing, or transferring it, controlling copyrights associated with these operations for digital data content is a serious problem.

Because there has been hitherto no adequate method for controlling a copyright for digital data content, the copyright is handled by the copyright law or contracts. Even in the copyright law, compensation money for a digital-type sound- or picture-recorder is only systematized.

Use of a data content includes not only referring to its contents but also normally effectively using by storing, copying, or editing obtained data person via on-line basis by a communication line or via off-line basis using a proper recording medium. Furthermore, it is possible to transmit the edited data content to the database to be registered as new data content.

In a conventional database system, only character data content is handled. In a multimedia system, however, audio data content and picture data content which are originally analog data contents are digitalized and formed into a database in addition to the data content such as characters which have been formed into a database so far.

Under these circumstances, how to deal with a copyright of data content in a database is a large problem. However, there has not been adequate copyright management means for solving the problem so far, particularly copyright management means completed for secondary utilization such as copying, editing, or transferring of the data content.

The inventor of the present invention proposed a system for managing a copyright by obtaining a permit key from a key control center via a public telephone line in Japanese Patent Laid-Open No. 46419/1994 (GB 2269302A) and Japanese Patent Laid-Open No. 141004/1994 (U.S. Pat. No. 5,504,933) and moreover, proposed an apparatus for managing the copyright in Japanese Patent Laid-Open No. 132916/1994 (GB 2272822A).

Moreover, a copyright management method for primary utilization of digital data content such as display (including process to sound) or storage including real-time transmission of the digital data content in a database system and secondary utilization of the digital data content such as copying, editing, or transferring of the digital data content by further developing the above invention is proposed in Japanese Patent Application No. 64889/1994 (U.S. patent application Ser. No. 08/416,037).

The database copyright management system of the above application in order to manage the copyright, either one or more of a program for managing the copyright, copyright information, and a copyright control message are used in addition to a use permit key corresponding to a requested use, and data content which has been transferred with encryption is decrypted to be used for viewing and editing, and the data content is encrypted again when used for storing, copying and transferring.

The copyright control message is displayed when utilization beyond the range of the user's request or authorized operation is found to give caution or warning to a user and the copyright management program performs monitoring and managing so that utilization beyond the range of the user's request or authorized operation is not performed.

On the other hand, it is widely practiced to establish LAN (Local Area Network) by connecting computers with each other in offices, organizations, companies, etc. Also, a plurality of networks are connected with each other, and Internet is now organized in a global scale, by which a plurality of networks are utilized as if they are a single network.

In LAN used in an organization such as firms, secret information is often stored, which must not be disclosed to outsiders. For this reason, it is necessary to arrange the secret information in such a manner that only a specific group of users can gain access and use such information, and such access is generally placed under control to prevent leakage of secret information to outsiders.

There are roughly two methods to control the access: a method to control access with access permission, and a method to do it by encryption.

The method of access control by access permission is described in U.S. Pat. Nos. 5,173,939, 5,220,604, 5,224,163, 5,315,657, 5,414,772 and 5,438,508, in EP506435, and in JP Laid-Open 169540/1987.

The access control method based on encryption is disclosed in U.S. Pat. Nos. 4,736,422, 5,224,163, 5,400,403, 5,457,746, and 5,584,023, in EP 438154 and EP 506435, and in JP Laid-Open 145923/1993. The access control method based on encryption and digital signature is described in U.S. Pat. Nos. 4,919,545 and 5,465,299.

Intranet is now being propagated, in which a plurality of LANs are connected with each other via Internet and these LANs are utilized as if they are a single LAN. In the intranet, information exchange is performed via Internet, which basically provides no guarantee for prevention of piracy, and information is encrypted to prevent the piracy when secret information is exchanged.

The prevention of information piracy during transmission by means of encryption is disclosed in U.S. Pat. Nos. 5,504,818 and 5,515,441, and the use of a plurality of crypt keys is described in U.S. Pat. Nos. 5,504,816; 5,353,351, 5,475,757, and 5,381,480. Also, performing re-encryption is described in U.S. Pat. No. 5,479,514.

When encrypting, management of crypt key including transfer and receipt of crypt key becomes an important issue. Generation of keys by IC card is disclosed in U.S. Pat. No. 5,577,121, and encryption/decryption by IC card is disclosed in U.S. Pat. Nos. 5,347,581 and 5,504,817. Also, electronic watermark technique is described in EP 649074.

In the video conference system, a television picture has been added to the conventional voice telephone set. Recently, the video conference system is advanced in which a computer system is incorporated in the video conference system so that the quality of the voice and the picture are improved, and data content can be handled at the same time as well as the voice and the picture.

Under these circumstances, security against the violation of the user's privacy and the data content leakage due to eavesdropping by persons other than the participants of the conference are protected by the cryptosystem using a secret-key.

However, since the conference content obtained by the participants themselves are decrypted, in the case where participants themselves store the content of the conference and sometimes edit the content, and further, use for secondary usage such as distribution to the persons other than the participants of the conference, the privacy of other participants of the video conference and data content security remains unprotected.

In particular, the compression technology of the transfer of data content is advanced while the volume of the data content storage medium is advanced with the result that the possibility is getting more and more realistic that all the content of the video conference may be copied to the data content storage medium or transmitted via a network.

Also, electronic commerce system with digital data content for commercial dealing is now being used for practical applications. Above all, various types of experiments are now under way for digital cash system to exchange electronic data content instead of cash so that the system can be used by general public.

The digital cash system which has been proposed so far is based on a secret-key cryptosystem. The encrypted digital cash data content is transferred from a bank account or a cash service of a credit company, and is stored in an IC card so that a terminal device for input/output is used to make a payment. The digital cash system which uses this IC card as a cash-box can be used at any place such as shops or the like as long as the input/output terminal is installed. However, the system cannot be used at places such as homes or the like where no input/output terminal is installed.

Since the digital cash is an encrypted data content, any device can be used as the cash-box which stores digital cash data content, in addition to the IC card, as long as the device can store encrypted data content and transmit the data content to the party to which the payment is made. As a terminal which can be specifically used as the cash-box, there are personal computers, intelligent television sets, portable telephone sets such as personal digital assistant (PDA), personal handyphone system (PHS), intelligent telephone sets, and PC cards or the like which has an input/output function.

It is desirable that the digital cash is processed as an object associated with data content and functions instead of being as a simple data content. In handling a digital cash, there are a common digital cash form, an unentered digital cash form private for an owner, an entry column in the digital cash form private for the owner, a digital cash data content showing an amount of money, an instruction of handling digital cash, and a digital cash form private for the owner in which an amount of money is entered. In an object-oriented programming, concepts such as an object, a class, a slot, a message and an instance are used.

In these correspondence relations, the common digital cash form is the object; the unentered digital cash form private for an owner: the class; the entry column of a digital cash form private for the owner: the slot; the instruction of handling digital cash: the message; and the digital cash form private for the owner in which an amount of money is entered: the instance.

A digital cash data content comprising the amount of money and the like is used as an argument, then, is transferred and stored in the slot which is referred to as an instance variable by the message so that a new instance is made which is a digital cash in which the amount of money is renewed.

The encryption technique used in the data management system is utilized not only in the distribution of copyrighted data content but also in the distribution of digital cash.

Then, basic encryption-related technique used in the present invention is described below.

Crypt Key

Secret-key system is also called "common key system" because the same key is used for encryption and decryption, and because it is necessary to keep the key in secret, it is also called "secret-key system." Typical examples of encryption algorithm using secret-key are: DES (Data Encryption Standard) system of National Bureau of Standards, FEAL (Fast Encryption Algorithm) system of NTT, and MISTY system of Mitsubishi Electric Corp. In the embodiments described below, the secret-key is referred as "Ks".

In contrast, the public-key system is a cryptosystem using a public-key being made public and a private-key, which is maintained in secret to those other than the owner of the key. One key is used for encryption and the other key is used for decryption. Typical example is RSA public-key system. In the embodiments described below, the public-key is referred as "Kb", and the private-key is referred as "Kv".

Here, the operation to encrypt data content, a plain text material M to a cryptogram Cks using a secret-key Ks is expressed as:

$$Cks=E(M, Ks).$$

The operation to decrypt the cryptogram Cks to the plain text data content M using a crypt key Ks is expressed as:

$$M=D(Cks, Ks).$$

Also, the operation to encrypt the plain text data content M to a cryptogram Ckb using a public key Kb is expressed as:

$$Ckb=E(M, Kb).$$

The operation to decrypt the cryptogram Ckb to the plain text data content M using a private-key Kv is expressed as:

$$M=D(Kv, Kv).$$

The operation to encrypt the plain text data content M to a cryptogram Ckv using a private-key Kv is expressed as:

$$Ckv=E(M, Kv),$$

and the operation to decrypt the cryptogram Ckv to the plain text data content M using the public-key Kb is expressed as:

$$M=D(Ckb, Kb).$$

The encryption technique is the means to exclude illegitimate use of data content, but perfect operation is not guaranteed. Thus, the possibility of illegitimate use of data content cannot be completely excluded.

On the other hand, electronic watermark technique cannot exclude the possibility of illegitimate use, but if illegitimate use is detected, it is possible to check the illegitimate use by verifying the content of electronic watermark, and there are a number of methods in this technique. These methods are described in Nikkei Electronics, No. 683, 1997-2-24, pp. 99–124, "'Digital watermark' to help stop to use illegal proprietary digital works in the multimedia age." Also, description is given on this technique by Walter Bender et al., "Introducing data-hiding technology to support digital watermark for protecting copyrights," IBM System Journal, vol. 35, Nos. 3 & 4, International Business Machines Corporation.

SUMMARY OF THE INVENTION

To prevent piracy or leakage of data content, a cryptography technique and electronic watermark technique are combined together and used. In a data content supplied to a first user, a first user data is entered as electronic watermark by a data management center, and the data content with an electronic watermark entered in it is encrypted using a crypt key and is supplied. The encrypted data content is decrypted using a crypt key distributed from the data management center and is used. In case it is to be stored, it is encrypted using another crypt key.

In case the data content is copied and transferred to a second user, a user data of the second user is entered as electronic watermark, and a scenario to enter the user data of the second user as electronic watermark is registered at the data management center, and the data content with electronic watermark entered in it is encrypted using another crypt key and is supplied. When the validity of the second user is confirmed by the scenario, another crypt key is distributed to the second user. The encrypted data content is decrypted using another crypt key and is used. When it is to be stored, it is encrypted using still another key.

In the data content obtained by the first user, the first user data is entered as electronic watermark by a data center. If the data content is copied and transferred without taking a normal procedure, the data center verifies the electronic watermark entered there, and it is possible to detect that the first user has copied and transferred the data content without taking a normal procedure.

When it is copied and transferred by a normal procedure, electronic watermark of each user is entered, and this makes it possible to clearly define the route of copying and transfer. When copying and transfer are repeated, noise in the data content is increased by the entered electronic watermark, and this makes it possible to exclude and inhibit copying and transfer, i.e. to decrease the risk of illegitimate utilization of data content.

Because a key used for encryption of the data content is stored at the key center, the key center can be utilized when a key escrow system or a key recovery system is used in a practical application.

Further, the secret-key can be used as user data and the secret-key is encrypted using the public-key of the data center and this is entered as electronic watermark. By decrypting this using the private-key of the data center when necessary and by confirming the secret-key, it is possible to achieve a key escrow system or a key recovery system in simple manner but with high security.

In addition to copyright management of data content using a charged crypt key, the present invention is also applicable in applications such as maintenance of privacy of participants in a video conference based on a video conference system using a free-of-charge crypt key and also for maintenance of security of the data content, or the maintenance of data security in electronic data interchange (EDI) such as electronic commerce.

DETAILED DESCRIPTION OF THE INVENTION

The present invention is a digital data management system described with respect to copyright management. In the following description, numerous specific details are set forth to provide a more thorough description of the present invention. It will be apparent, however, to one skilled in the art, that the present invention may be practiced without these specific details. In other instances, well known features have not been described in detail so as not to obscure the present invention.

The following explanation is provided to illustrate various embodiments of the invention.

[Embodiment 1]

Figure 1:
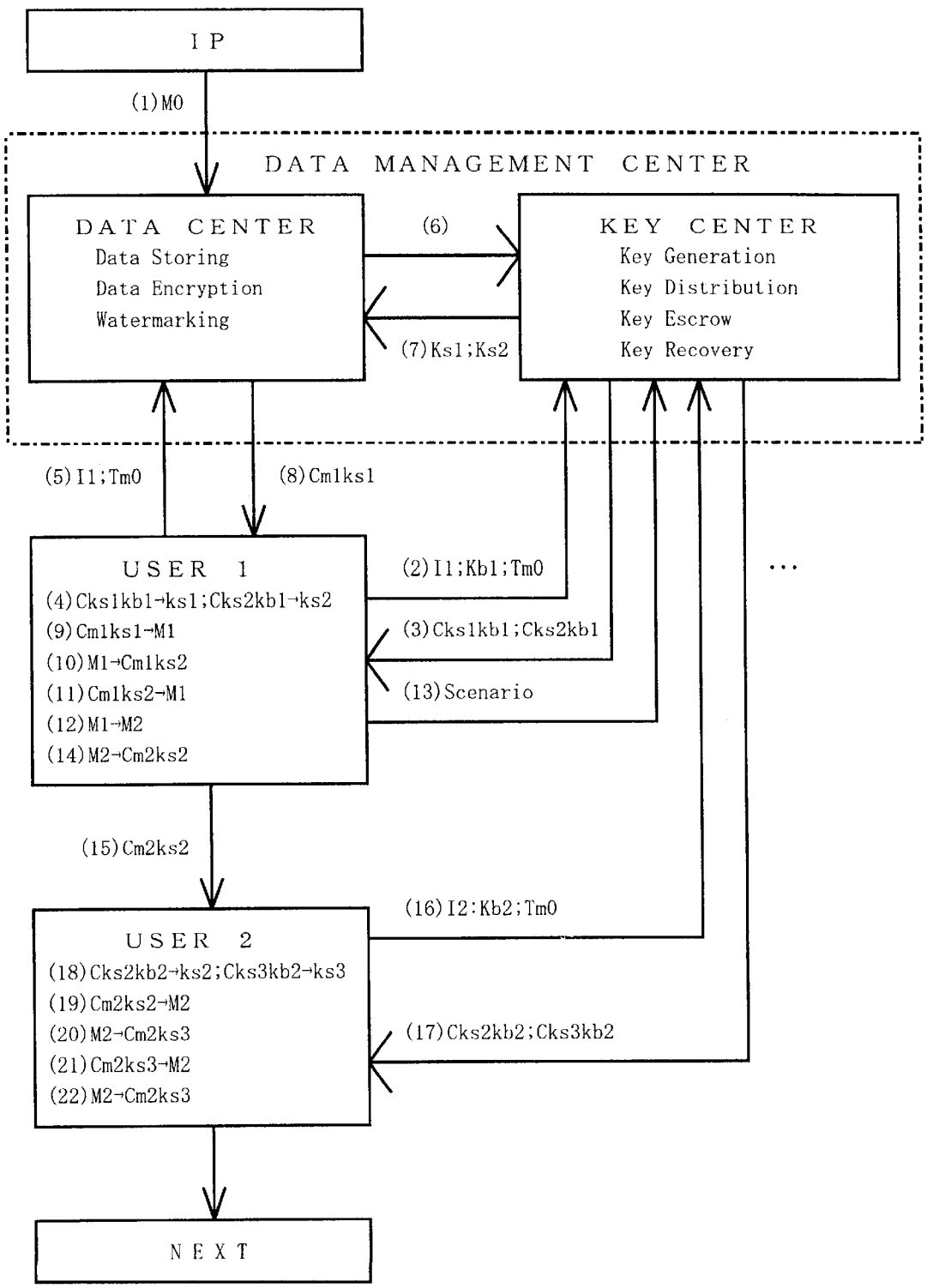
FIG. 1 is a block diagram of a data management system of a first embodiment of the present invention.

Description is given now on the first embodiment of the invention referring to FIG. 1.

(1) A data management center comprises a data center and a key center, while these may be organizations independent from each other. At the data center in the data management center, data content M0 of IP (information provider) may be stored in database in advance or may be transferred from IP each time at the request of a first user U1.

(2) The first user U1 specifies a data content name Tm0 to the key center, presents a user data I1 and a public-key Kb1 of the first user, and requests the distribution of a secret-key Ks1 for decryption and a secret-key Ks2 for re-encryption.

As the user data, a user ID, a user E-mail address or a secret-key generated to the request of secret-key of the user can be used. Further, a random number prepared by the data center as the one specific for the user can be used.

Also, it may be designed in such a manner that the data management center combines the first user information (having data amount of several tens of bytes in general) with the first user public-key Kb1 (having data amount of about one thousand bits) and obtains a first user data I1 (having data amount of one thousand and several hundreds of bits), and that MD5 hash value of 16 bytes, obtained by turning the first user data I1 to hash value by MD5 hash algorithm, can be used as the user data.

(3) The key center generates the secret-keys Ks1 and Ks2 and stores them together with the data content name Tm0, the first user data I1 and the first user public-key Kb1, and the secret-keys Ks1 and Ks2 are encrypted using the first user public-key Kb1:

$Cks1kb1 = E(Ks1, Kb1)$ $Cks2kb1 = E(Ks2, Kb1)$ and the encrypted secret-keys Cks1*kb1* and Cks2*kb1* are distributed to the first user.

(4) The first user U1 decrypts the distributed secret-keys Cks1$kb$1 and Cks2$kb$1 for encryption using the first user private-key Kv1:

$$Ks1=D(Cks1kb1, Kv1)$$

$$Ks2=D(Cks2kb1, Kv1).$$

The decrypted secret-keys Ks1 and Ks2 are stored in the device. The user is not the owner of the secret-keys Ks1 and Ks2, but the key center or the data center is the owner. Because there may be possibility of improper use of the secret-keys if the management of the secret-keys is made by the user, the secret-keys Ks1 and Ks2 are automatically stored in IC card, PCMCIA card, insert board or software which are not under the user's control.

Here, the fee to use the data content M0 is charged. The secret-keys Ks1 and Ks2 can be generated using the first user data I1. If the data content name and the first user data I1 are available, Ks1 can be generated again. Therefore, it will suffice that the data content name Tm0, the first user data I1 and the first user public-key Kb1 are stored. The secret-keys may be selected each time from library of the key center instead of generating them.

Japanese Patent Laid-Open 271865/1995, filed by the present inventor, describes a method to divide a copyright management program and to distribute by attaching to each data content and key.

This method can be applied to the secret-keys themselves, and the secret-key Ks1 can be divided to partial secret-keys Ks11 and Ks12 as:

$$Ks11+Ks12=Ks1$$

and the secret-key Ks2 can be divided to partial secret-keys Ks21 and Ks22 as:

$$Ks21+Ks22=Ks2.$$

The partial secret-keys Ks11 and Ks21 are distributed as partial secret-keys, and the remaining partial secret-keys Ks12 and Ks22 are attached to the data content and distributed. Then, the first user cannot engage any more in the management of the secret-keys Ks1 and Ks2.

(5) The first user U1 presents the first user data I1, specifies the data content name Tm0, and requests the distribution of the data content M0 to the data center.

(6) The data center transfers the first user data I1 and the data content name Tm0 presented by the first user to the key center and asks to transfer the secret-keys Ks1 and Ks2.

(7) The key center transfers the secret-keys Ks1 and Ks2 to the data center.

(8) The data center encrypts the first user data I1 using the public-key Kb0 of the data center:

$$Ci1kb0=E(I1, Kb0),$$

and the encrypted first user data Ci1$kb$0 is entered as an electronic watermark Wci1$kb$0 to the data content M0 requested by the first user U1, and a data content M1 with electronic watermark is edited as:

$$M1=M0+Wci1kb0.$$

And this is further encrypted using the secret-key Ks1:

$$Cm1ks1=E(M1, Ks1),$$

to be an encrypted electronic watermarked data content Cm1$ks$1. This is distributed to the first user U1 by data communication or data broadcasting or by recording on a medium.

The scenario of editing process of the data content M1 (information relating to electronic watermark-such as the first user data) is stored to use for verification.

As a simplified procedure, the first user data I1 may be entered as an electronic watermark Wi1 instead of the encrypted first user data Ci1$kb$0 for the electronic watermark.

(9) The first user U1 decrypts the encrypted electronic watermarked data content Cm1$ks$1 using the secret-key Ks1 for decryption:

$$M1=D(Cm1ks1, Ks1)$$

and uses it.

In this case, the secret-key Ks1 is abandoned by the procedure such as overwriting of the secret-key Ks2 on the secret-key Ks1.

(10) When the data content M1 is stored in the storage unit, the data content M1 is re-encrypted using the secret-key Ks2 for re-encryption:

$$Cm1ks2=E(M1, Ks2)$$

and it is stored as a re-encrypted data content Cm1$ks$2.

(11) When the first user re-uses the re-encrypted data content Cm1$ks$2, the first user U1 reads the re-encrypted data content Cm1$ks$2 stored in the storage unit on memory, and decrypts it using the secret-key Ks2 and uses it. When the first user stores the data content M1 again, the data content M1 is re-encrypted using the secret-key Ks2 for re-encryption, and the re-encrypted data content Cm1$ks$2 is stored in the storage unit.

(12) In case the first user transfers the data content M1 to a second user U2, the first user U1 encrypts a second user data I2 using a public-key Kb0 of the data center:

$$Ci2kb0=E(I2, Kb0),$$

enters the encrypted second user data Ci2$kb$0 as electronic watermark Wci2$kb$0 to the data content M1 requested by the second user U2 and edits to a data content M2 with electronic watermark:

$$M2=M1+Wci2kb0=(M0+Wci1kb0)+Wci2kb0.$$

As a simplified procedure, the second user data I2 may be entered as electronic watermark Wi2 instead of the encrypted second user data Ci2$kb$0.

(13) After the data content M1 with electronic watermark is edited to the data content M2 with electronic watermark, the first user U1 transfers the scenario of editing process of the edited data content M2, i.e., information relating to electronic watermark such as the second user data, to the key center and registers it. As a result, the second user can use the data content.

(14) Further, the first user U1 encrypts the data content M2 with electronic watermark using the secret-key Ks2:

$$Cm2ks2=E(M2, Ks2)$$

and encrypted electronic watermarked data content Cm2$ks$2 is obtained.

(15) The first user U1 transfers the encrypted electronic watermarked data content Cm2$ks$2 to the second user U2 by data communication or by copying it on a medium.

(16) The second user U2 stores the transferred encrypted electronic watermarked data content Cm2$ks$2 in the storage unit.

The second user U2 specifies the data content name Tm0 to the key center, presents a public-key Kb2 of the second user, and requests the distribution of the secret-key Ks2 for decryption and the secret-key Ks3 for re-encryption.

(17) The key center confirms according to the stored scenario that the second user U2 is a valid user and generates the secret-key Ks3 and stores it. Then, the stored secret-key Ks2 and the generated secret-key Ks3 are encrypted using the public-key Kb2 of the second user:

$$Cks2kb2=E(Ks2, Kb2)$$

$$Cks3kb2=E(Ks3, Kb2).$$

Then, the encrypted secret-key Cks2*kb*2 and the encrypted secret-key Cks3*kb*2 are distributed to the second user U2.

(18) The second user U2 decrypts the encrypted secret-keys Cks2*kb*2 and Cks3*kb*2 using a private-key Kv2 of the second user:

$$Ks2=D(Cks2kb2, Kv2)$$

$$Ks3=D(Cks3kb2, Kv2).$$

The decrypted secret-keys Ks2 and Ks3 are stored in IC card, PCMCIA card, insert board or software.

The secret-keys Ks2 and Ks3 at the second user are handled and are decrypted and stored in the same manner as the secret-keys Ks1 and Ks2 at the first user.

(19) The second user U2 reads the encrypted electronic watermarked data content Cm2*ks*2 stored in the storage unit on memory and decrypts it using the stored secret-key Ks2:

$$M2=D(Cm2ks2, Ks2)$$

and uses it.

In this case, the secret-key Ks2 is abandoned by the procedure such as overwriting of the secret-key Ks3 on the secret-key Ks2.

(20) When the data content M2 is stored again in the storage unit, the data content M2 is re-encrypted using the secret-key Ks3 for re-encryption and is stored as the re-encrypted data content Cm2*ks*3.

(21) When the second user U2 re-uses the re-encrypted data content Cm2*ks*3, the re-encrypted data content Cm2*ks*3 stored in the storage unit is read on memory, and it is decrypted using the secret-key Ks3 and is used.

(22) When the second user stores the data content M2 again, the data content M2 is re-encrypted using the secret-key Ks3 for re-encryption, and the re-encrypted data content Cm2*ks*3 is stored in the storage unit.

Then, the same procedure is repeated.

The embodiment as described above is arranged under the assumption that the distributed data content is utilized at real time, while it may be designed in such a manner that the data content obtained in advance and stored by the user is decrypted later and is used.

In such a case, the first user is at the position of the second user in the above embodiment, and a similar operation is performed.

As it is evident from the above description, the first user data is entered as electronic watermark in the data content obtained by the first user by the data center.

Therefore, if it is copied and transferred without taking a normal procedure, the data center verifies the electronic watermark entered therein, and it is detected that the first user has copied and transferred it without taking a normal procedure.

When it is copied and transferred by a normal procedure, electronic watermark of each user is entered in the data content, and this dears the route of copying and transfer. When copying and transfer are repeated, noise in the data content increases by the entered electronic watermark, and this makes it possible to exclude and inhibit copying and transfer, i.e. to decrease the risk of illegitimate utilization.

Because a key used for encrypting the data content is stored at the key center, the key center can be utilized when a key escrow system or a key recovery system is used in a practical application.

Further, the secret-key can be used as user data, and the secret-key is encrypted using the public-key of the data center and this is entered as electronic watermark. By decrypting this using the private-key of the data center when necessary and by confirming the secret-key, it is possible to achieve a key escrow system or a key recovery system in a simple but highly secure manner.

[Embodiment 2]

Figure 2:
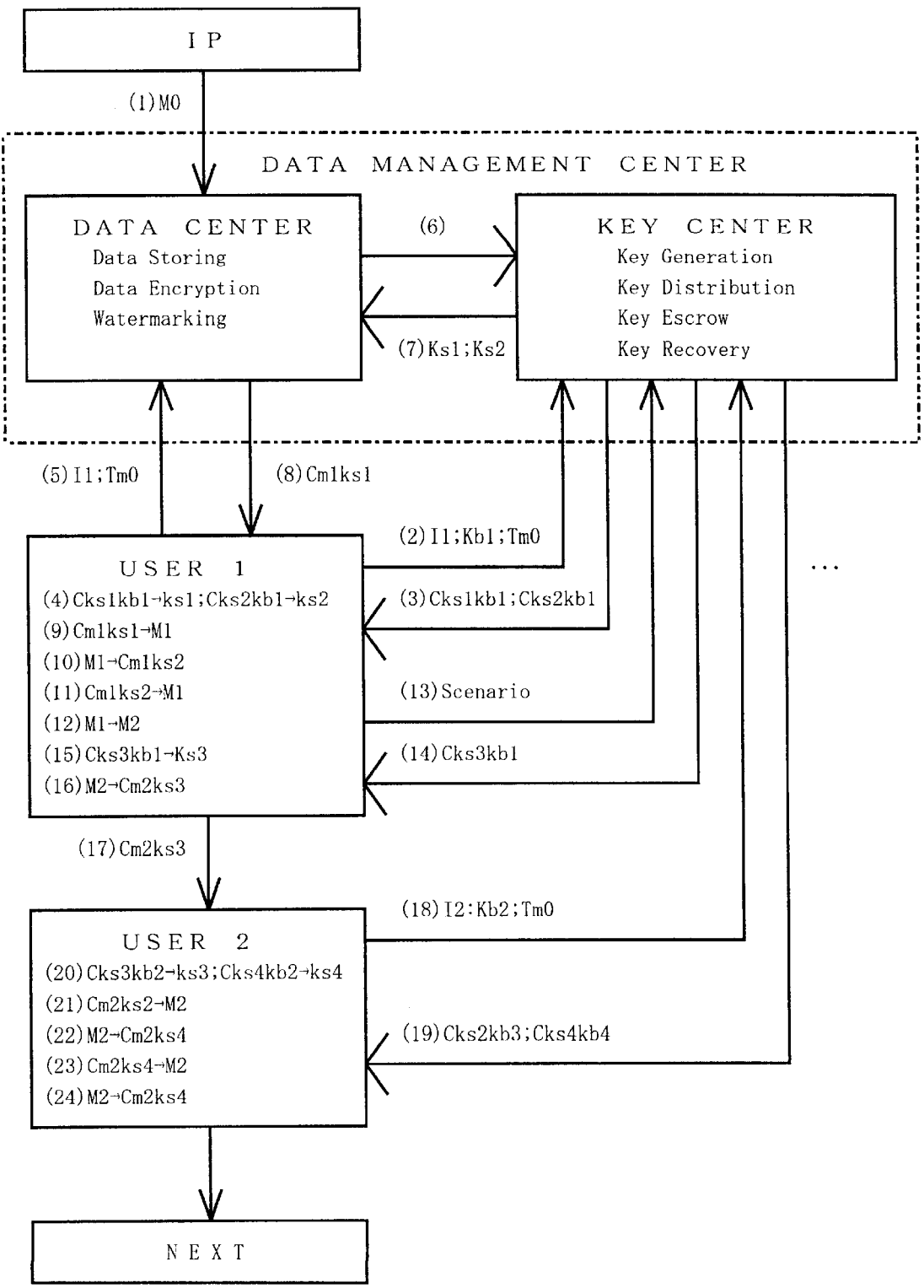
FIG. 2 is a block diagram of a data management system of a second embodiment of the present invention.

Description is given now on a second embodiment of the invention referring to FIG. 2.

(1) A data management center comprises a data center and a key center, while these may be organizations independent of each other.

At the data center in the data management center, a data content M0 of IP (information provider) is stored in database in advance or the data content M0 is transferred from IP each time at the request of the first user U1.

(2) The first user U1 specifies a data content name Tm to the key center, presents a user data I1 and a public-key Kb1 of the first user, and requests the distribution of a secret-key Ks1 for decryption and a secret-key Ks2 for re-encryption.

Here, the fee to use the data content M0 is charged.

As the user data, a user ID, a user E-mail address or a secret-key generated to the request of secret-key of the user can be used. Further, a random number prepared by the data center as the one specific for the user can be used.

Also, it may be designed in such a manner that the data management center combines the first user information (having data amount of several tens of bytes in general) with a first user public-key Kb1 (having data amount of about 1000 bits) and obtains a first user data I1 (having data amount of one thousand and several hundreds of bits), and that MD5 hash value of 16 bytes, obtained by turning the first user data I1 to hash value by MD5 hash algorithm, can be used as the user data.

(3) The key center generates the secret-keys Ks1 and Ks2 and stores them together with a data content name Tm0, the first user data I1 and the first user public-key Kb1, and the secret-keys Ks1 and Ks2 are encrypted using the first user public-key Kb1:

$$Cks1kb1=E(Ks1, Kb1)$$

$$Cks2kb1=E(Ks2, Kb1)$$

and the encrypted secret-keys Cks1*kb*1 and Cks2*kb*1 are distributed to the first user.

(4) The first user U1 decrypts the secret-keys Cks1*kb*1 and Cks2*kb*1 thus distributed using the first user private-key Kv1:

$$Ks1=D(Cks1kb1, Kv1)$$

$$Ks2=D(Cks2kb1, Kv1).$$

The decrypted secret-keys Ks1 and Ks2 are stored in the device. The user is not the owner of the secret-keys Ks1 and ks2, but the key center or the data center is the owner. Because there may be possibility of improper use of the secret-keys if the management of the secret-keys is made by the user, the secret-keys Ks1 and Ks2 are automatically stored in IC card, PCMCIA card, insert board or software which are not under the user's control.

The secret-keys Ks1 and Ks2 can be generated using the first user data I1. If the data content name and the first user data I1 are available, Ks1 can be generated again. Therefore, it will suffice that the data content name Tm0, the first user data I1 and the first user public-key Kb1 are stored.

The secret-key may be selected each time from library of the key center instead of generating them.

Japanese Patent Laid-Open 271865/1995, filed by the present inventor, describes a method to divide a copyright management program and to distribute respectively together with data content and key attached thereto.

This method can be applied to the secret-keys themselves, and the secret-key Ks1 can be divided to partial secret-keys Ks11 and Ks12 as:

$$Ks11+Ks12=Ks1$$

and the secret-key Ks2 can be divided to secret-keys Ks21 and Ks22 as:

$$Ks21+Ks22=Ks2.$$

The partial secret-keys Ks11 and Ks21 are distributed as partial secret-keys, and the remaining partial secret-keys Ks12 and Ks22 are attached to the data content and distributed. Then, the first user cannot engage any more in the management of the secret-keys Ks1 and Ks2.

(5) The first user U1 presents the first user data I1, specifies the data content name Tm0, and requests the distribution of the data content M0 to the data center.

(6) The data center transfers the first user data I1 and the data content name Tm0 presented by the first user to the key center and asks to transfer the secret-keys Ks1 and Ks2.

(7) The key center transfers the secret-keys Ks1 and Ks2 to the data center.

(8) The data center encrypts the first user data I1 using the public-key Kb0 of the data center:

$$Ci1kb0=E(I1, Kb0)$$

to an encrypted first user data Ci1$kb$0. The encrypted first user data Ci1$kb$0 is entered as an electronic watermark Wci1$kb$0 to the data content M0, and a data content M1 with electronic watermark is edited:

$$M1=M0+Wci1kb0,$$

and this is further encrypted using the secret-key Ks1:

$$Cm1ks1=E(M1, Ks1).$$

Then, encrypted electronic watermarked data content Cm1$ks$1 is distributed to the first user U1 by data communication or data broadcasting or by recording on a medium.

The scenario of editing process of the data content M1 (information relating to electronic watermark such as the first user data) is stored to use for verification.

As a simplified procedure, the first user data I1 may be entered as an electronic watermark Wi1 instead of the encrypted first user data Ci1$kb$0 for electronic watermark.

(9) The first user U1 decrypts the encrypted electronic watermarked data content Cm1$ks$1 using the secret-key Ks1 for decryption:

$$M1=D(Cm1ks1, Ks1)$$

and uses it.

In this case, the secret-key Ks1 is abandoned by a procedure such as overwriting of the secret-key Ks2 on the secret-key Ks1.

(10) When the data content M1 is stored in the storage unit, the data content M1 is re-encrypted using the secret-key Ks2 for re-encryption:

$$Cm1ks2=E(M1, Ks2)$$

and it is stored as a re-encrypted data content Cm1$ks$2.

(11) When the first user re-uses the re-encrypted data content Cm1$ks$2, the first user U1 reads the re-encrypted data content Cm1$ks$2 stored in the storage unit on memory, and decrypts it using the secret-key Ks2 and uses it. When the first user stores the data content M1 again, the data content M1 is re-encrypted using the secret-key Ks2 for re-encryption, and the re-encrypted data content Cm1$ks$2 is stored in the storage unit.

(12) In case the first user transfers the data content M1 to a second user U2, the first user U1 encrypts a second user data I2 using a public-key Kb0 of the data center:

$$Ci2kb0=E(I2, Kb0),$$

then, enters the encrypted second user data Ci2$kb$0 as electronic watermark Wci2$kb$0 in the data content M1 requested by the second user U2, and edits to a data content M2 with electronic watermark:

$$M2=M1+Wci2kb0=(M0+Wci1kb0)+Wci2kb0.$$

As a simplified procedure, the second user data I2 may be entered as electronic watermark Wi2 instead of the encrypted second user data Ci2$kb$0.

(13) After the data content M1 with electronic watermark is edited to the data content M2 with electronic watermark, the first user U1 transfers the scenario of editing process of the edited data content M2 (information relating to electronic watermark such as the second user data) to the key center and registers it. As a result, the second user can use the data content.

(14) The key center stores the scenario of editing process registered by the first user, and generates a secret-key Ks3. Then, it is encrypted using the public-key Kb1 of the first user:

$$Cks3b1=E(Ks3, Kb1)$$

and the encrypted secret-key Cks3$kb$1 is distributed to the first user.

(15) The first user U1 decrypts the distributed encrypted secret-key Cks3$kb$1 using the private-key Kv1 of the first user:

$$Ks3=D(Cks3kb1, Kv1).$$

(16) Further, data content M2 with electronic watermark is encrypted using the decrypted secret-key Ks3:

$$Cm2ks3=E(M2, Ks3)$$

and encrypted electronic watermarked data content Cm2$ks$3 is obtained.

(17) The first user U1 transfers the encrypted electronic watermarked data content Cm2$ks$3 to the second user U2 by data communication or by copying it on a medium.

(18) The second user U2 stores the transferred encrypted electronic watermarked data content Cm2$ks$3 in the storage unit.

The second user U2 specifies the data content name Tm0 to the key center, presents the public-key Kb2 of the second user, and requests the distribution of the secret-key Ks3 for decryption and a secret-key Ks4 for re-encryption.

(19) The key center confirms according to the stored scenario that the second user U2 is a valid user and generates the secret-key Ks4 and stores it. Then, the secret-key Ks4 and the stored secret-key Ks3 are encrypted using the public-key Kb2 of the second user:

$$Cks3kb2=E(Ks3, Kb2)$$

$$Cks4kb2=E(Ks4, Kb2)$$

and the encrypted secret-keys Cks3$kb2$ and Cks4$kb2$ are distributed to the second user.

(20) The second user U2 decrypts the encrypted secret-keys Cks3$kb2$ and Cks4$kb2$ using the private-key Kv2 of the second user:

$$Ks3=D(Cks3kb2, Kv2)$$

$$Ks4=D(Cks4kb2, Kv2)$$

and the decrypted secret-keys Ks3 and Ks4 are stored in IC card, PCMCIA card, insert board or software.

The secret-keys Ks3 and Ks4 at the second user are handled in the same manner as the secret-keys Ks1 and Ks2 at the first user.

(21) The second user U2 reads the encrypted electronic watermarked data content Cm2$ks3$ stored in the storage unit on memory and decrypts it using the stored secret-key Ks3:

$$M2=D(Cm2ks3, Ks3)$$

and uses it.

Here, the secret-key Ks3 is abandoned by a procedure such as overwriting of the secret-key Ks4 on the secret-key Ks3.

(22) When the data content M2 is stored again in the storage unit, the data content M2 is re-encrypted using the secret-key Ks4 for re-encryption and is stored as a re-encrypted data content Cm2$ks4$.

(23) In case the second user U2 re-uses the re-encrypted data content Cm2$ks4$, the re-encrypted data content Cm2$ks4$ stored in the storage unit is read on memory, and it is decrypted using the secret-key Ks4 and is used.

(24) Further, when the second user stores the data content M2 again, the data content M2 is re-encrypted using the secret-key Ks4 for re-encryption, and the re-encrypted data content Cm2$ks4$ is stored in the storage unit.

Then, the same procedure is repeated.

The embodiment as described above is arranged under the assumption that the distributed data content is utilized in real time, while it may be designed in such a manner that the data content obtained in advance and stored by the user is decrypted later and is used.

In such a case, the first user is at the position of the second user in the above embodiment, and a similar operation is performed.

As it is evident from the above description, the first user data is entered as electronic watermark in the data content obtained by the first user by the data center.

Therefore, if it is copied and transferred without taking a normal procedure, the data center verifies the electronic watermark entered therein, and it is detected that the first user has copied and transferred it without taking a normal procedure.

When it is copied and transferred by a normal procedure, electronic watermark of each user is entered on the data content, and this clears the route of copying and transfer. When copying and transfer are repeated, noise in the data content increases by the entered electronic watermark, and this makes it possible to exclude and inhibit copying and transfer, i.e. to decrease the risk of illegitimate utilization.

Because a key used for encrypting the data content is stored at the key center, the key center can be utilized when a key escrow system or a key recovery system is used in a practical application.

Further, the secret-key can be used as user data, and the secret-key is encrypted using the public-key of the data center and this is entered as electronic watermark. By decrypting this using the private-key of the data center when necessary and by confirming the secret-key, it is possible to achieve a key escrow system or a key recovery system in simple manner but with high security.

[Embodiment 3]

Figure 3:
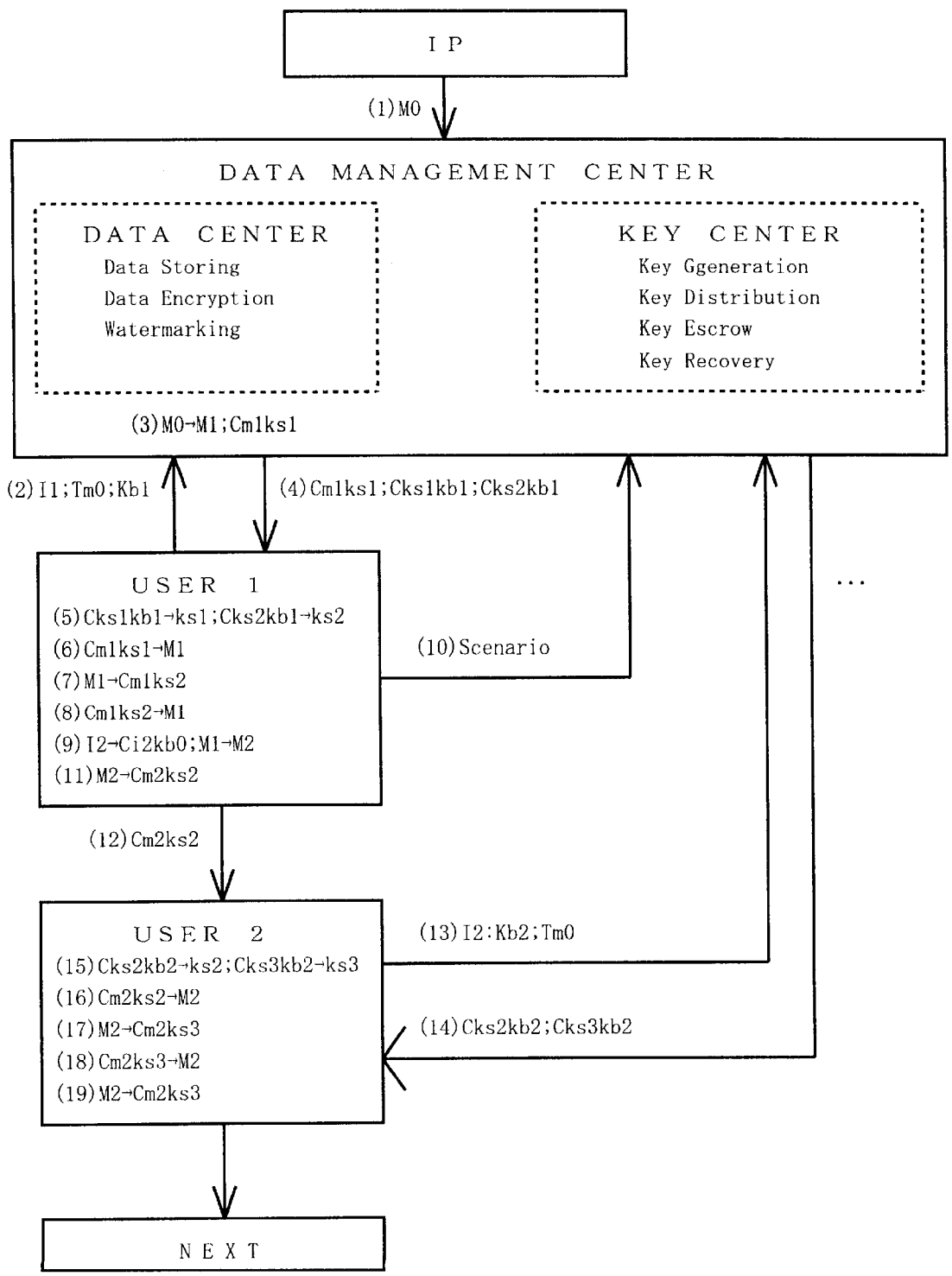
FIG. 3 is a block diagram of a data management system of a third embodiment of the present invention.

Description is given below on a third embodiment of the invention referring to FIG. 3.

(1) Unlike the first and the second embodiments, the data center and the key center in this embodiment are arranged in such a manner that they are a single data management center when seen from the user.

The data management center stores the data content M0 of IP (information provider) in database in advance or the data content M0 is transferred from IP each time at the request of the first user U1.

(2) The first user U1 specifies a data content name Tm0 to the data management center, presents a user data I1 and a public-key Kb1 of the first user, and requests the distribution of the data content M0 and secret-keys Ks1 and Ks2.

As the user data, a user ID, a user E-mail address or a secret-key generated to the request of secret-key of the user can be used. Further, a random number prepared by the data center as the one specific for the user can be used.

Also, it may be designed in such a manner that the data management center combines the first user information (having data amount of several tens of bytes in general) with a first user public-key Kb1 (having data amount of about 1000 bits) and obtains a first user data I1 (having data amount of one thousand and several hundreds of bits), and that MD5 hash value of 16 bytes, obtained by turning the first user data I1 to hash value by MD5 hash algorithm, can be used as the user data.

(3) The data management center generates the secret-keys Ks1 and Ks2 and encrypts the first user data I1 using the public-key Kb0 of the data center:

$$Ci1kb0=E(I1, Kb0)$$

to the encrypted first user data Ci1$kb0$. The encrypted first user data Ci1$kb0$ is entered in the data content M0 requested by the first user U1 as an electronic watermark Wci1$kb0$:

$$M1=M0+Wci1kb0.$$

Then, a data content M1 with electronic watermark is edited. The data content M1 with electronic watermark is encrypted using the secret-key Ks1:

$$Cm1ks1=E(M1, Ks1)$$

to encrypted electronic watermarked data content Cm1$ks1$.

(4) The data management center stores the generated secret-keys Ks1 and Ks2 together with the data content name Tm0, the first user data I1 and the first user public-key Kb1 and encrypts the secret-keys Ks1 and Ks2 using the public-key Kb1 of the first user:

$$Cks1kb1=E(Ks1, Kb1)$$

$$Cks2kb1=E(Ks2, Kb1).$$

Then, the two encrypted secret-keys and the encrypted electronic watermarked data content Cm1ks1 are distributed to the first user U1 by data communication or data broadcasting or by recording it on a medium.

The scenario of the editing process of the data content M1 (information relating to electronic watermark such as the first user data) is stored to use for verification.

As a simplified procedure, the first user data I1 may be entered as electronic watermark Wi1 instead of the encrypted first user data Ci1kb0.

(5) The first user U1 decrypts the encrypted secret-keys Cks1kb1 and Cks2kb1 thus distributed using the first user private-key Kv1:

$$Ks1=D(Cks1kb1, Kv1)$$

$$Ks2=D(Cks2kb1, Kv1)$$

and the decrypted secret-keys Ks1 and Ks2 are stored in the device. The user is not the owner of the secret-keys Ks1 and ks2, but the key center or the data center is the owner. Because there may be possibility of improper use of the secret-keys if the management of the secret-keys is made by the user, the secret-keys Ks1 and Ks2 are automatically stored in IC card, PCMCIA card, insert board or software which are not under user's control.

Here, the fee to use the data content M0 is charged.

The secret-keys Ks1 and Ks2 can be generated using the first user data I1. If the data content name and the first user data I1 are available, Ks1 can be generated again. Therefore, it will suffice that the data content name Tm0 and the first user data I1 are stored.

The secret-key may be selected each time from library of the key center instead of generating them.

Japanese Patent Laid-Open 271865/1995, filed by the present inventor, describes a method to divide a copyright management program and to distribute respectively together with data content and key attached thereto.

This method can be applied to the secret-keys themselves, and the secret-key Ks1 can be divided to partial secret-keys Ks11 and Ks12 as:

$$Ks11+Ks12=Ks1$$

and the secret-key Ks2 can be divided to partial secret-keys Ks21 and Ks22 as:

$$Ks21+Ks22=Ks2.$$

The partial secret-keys Ks11 and Ks21 are distributed as partial secret-keys, and the remaining partial secret-keys Ks12 and Ks22 are attached to the data content and distributed. Then, the first user cannot engage any more in the management of the secret-keys Ks1 and Ks2.

(6) The first user U1 decrypts the encrypted electronic watermarked data content Cm1ks1 using the secret-key Ks1 for decryption:

$$M1=D(Cm1ks1, Ks1)$$

and uses it.

In this case, the secret-key Ks1 is abandoned by a procedure such as overwriting of the secret-key Ks2 on the secret-key Ks1.

(7) When the data content M1 is stored in the storage unit, the data content M1 is re-encrypted using the secret-key Ks2 for re-encryption:

$$Cm1ks2=E(M1, Ks2)$$

and it is stored as a re-encrypted data content Cm1ks2.

(8) When the first user re-uses the re-encrypted data content Cm1ks2, the first user U1 reads the re-encrypted data content Cm1ks2 stored in the storage unit on memory, and decrypts it using the secret-key Ks2 and uses it. When the first user stores the data content M1 again, the data content M1 is re-encrypted using the secret-key Ks2 for re-encryption, and the re-encrypted data content Cm1ks2 is stored in the storage unit.

(9) In case the first user transfers the data content M1 to a second user U2, the first user U1 encrypts a second user data I2 using a public-key Kb0 of the data center:

$$Ci2kb0=E(I2, Kb0).$$

Then; the encrypted second user data Ci2kb0 is entered as electronic watermark Wci2kb0 in the data content M1 requested by the second user U2:

$$M2=M1+Wci2kb0=(M0+Wci1kb0)+Wci2kb0$$

and a data content M2 with electronic watermark is edited.

As a simplified procedure, the second user data I2 may be entered as electronic watermark Wi2 instead of the encrypted second user data Ci2kb0.

(10) After editing to the data content M2 with electronic watermark, the first user U1 transfers the scenario of the editing process of the edited data content M2 (information relating to electronic watermark such as the second user data) to the data management center and registers it. As a result, it is possible to utilize the data content of the second user.

(11) Further, the first user U1 encrypts the data content M2 with electronic watermark using the secret-key Ks2:

$$Cm2ks2=E(M2, Ks2)$$

and encrypted electronic watermarked data content Cm2ks2 is obtained.

(12) The first user transfers the encrypted electronic watermarked data content Cm2ks2 to the second user U2 by data communication or by copying it on a medium.

(13) The user U2 stores the transferred encrypted electronic watermarked data content Cm2ks2 in the storage unit.

The second user U2 specifies the data content name Tm0 to the data management center, presents the public-key Kb2 of the second user, and requests the distribution of the secret-key Ks2 for decryption and the secret-key Ks3 for re-encryption.

(14) The data management center confirms according to the stored scenario that the second user U2 is a valid user and generates the secret-key Ks3 and stores it. Then, the stored secret-key Ks2 and the generated secret-key Ks3 are encrypted using the public-key Kb2 of the second user;

$$Cks2kb2=E(Ks2, Kb2)$$

$$Cks3kb2=E(Ks3, Kb2).$$

Then, the encrypted secret-keys Cks2kb2 and Cks3kb2 are distributed to the second user.

(15) The second user U2 decrypts the encrypted secret-keys Cks2kb2 and Cks3kb2 using the private-key Kv2 of the second user:

$$Ks2=D(Cks2kb2, Kv2)$$

$$Ks3=D(Cks3kb2, Kv2).$$

The decrypted secret-keys Ks2 and Ks3 are stored in IC card, PCMCIA card, insert board or software.

The secret-keys Ks2 and Ks3 at the second user are handled, and decrypted and stored in the same manner as the secret-keys Ks1 and Ks2 at the first user.

(16) The second user U2 reads the encrypted electronic watermarked data content Cm2ks2 stored in the storage unit on memory and decrypts it using the stored secret-key Ks2:

$$M2=D(Cmsks2, Ks2)$$

and uses it.

In this case, the secret-key Ks2 is abandoned by a procedure such as overwriting of the secret-key Ks3 on the secret-key Ks2.

(17) When the data content M2 is stored again in the storage unit, the data content M2 is re-encrypted using the secret-key Ks3 for re-encryption, and it is stored as the re-encrypted data content Cm2ks3.

(18) When the second user U2 re-uses the re-encrypted data content Cm2ks3, the re-encrypted data content Cm2ks3 stored in the storage unit is read on memory, and it is decrypted using the secret-key Ks3 and is used.

(19) Further, when the second user stores the data content M2 again, the data content M2 is re-encrypted using the secret-key Ks3 for re-encryption, and the re-encrypted data content Cm2ks3 is stored in the storage unit.

Then, the same procedure is repeated.

The embodiment as described above is arranged under the assumption that the distributed data content is utilized in real time, while it may be designed in such a manner that the data content obtained in advance and stored by the user is decrypted later and is used.

In such a case, the first user is at the position of the second user in the above embodiment, and a similar operation is performed.

As it is evident from the above description, the first user data is entered as electronic watermark in the data content obtained by the first user by the data center.

Therefore, if it is copied and transferred without taking a normal procedure, the data center verifies the electronic watermark entered therein, and it is detected that the first user has copied and transferred it without taking a normal procedure.

When it is copied and transferred by a normal procedure, electronic watermark of each user is entered in the data content, and this clears the route of copying and transfer. When copying and transfer are repeated, noise in the data content increases by the entered electronic watermark, and this makes it possible to exclude and inhibit copying and transfer, i.e. to decrease the risk of illegitimate utilization.

Because a key used for encrypting the data content is stored at the data management center, the data management center can be utilized when a key escrow system or a key recovery system is used in a practical application.

[Embodiment 4]

Figure 4A:
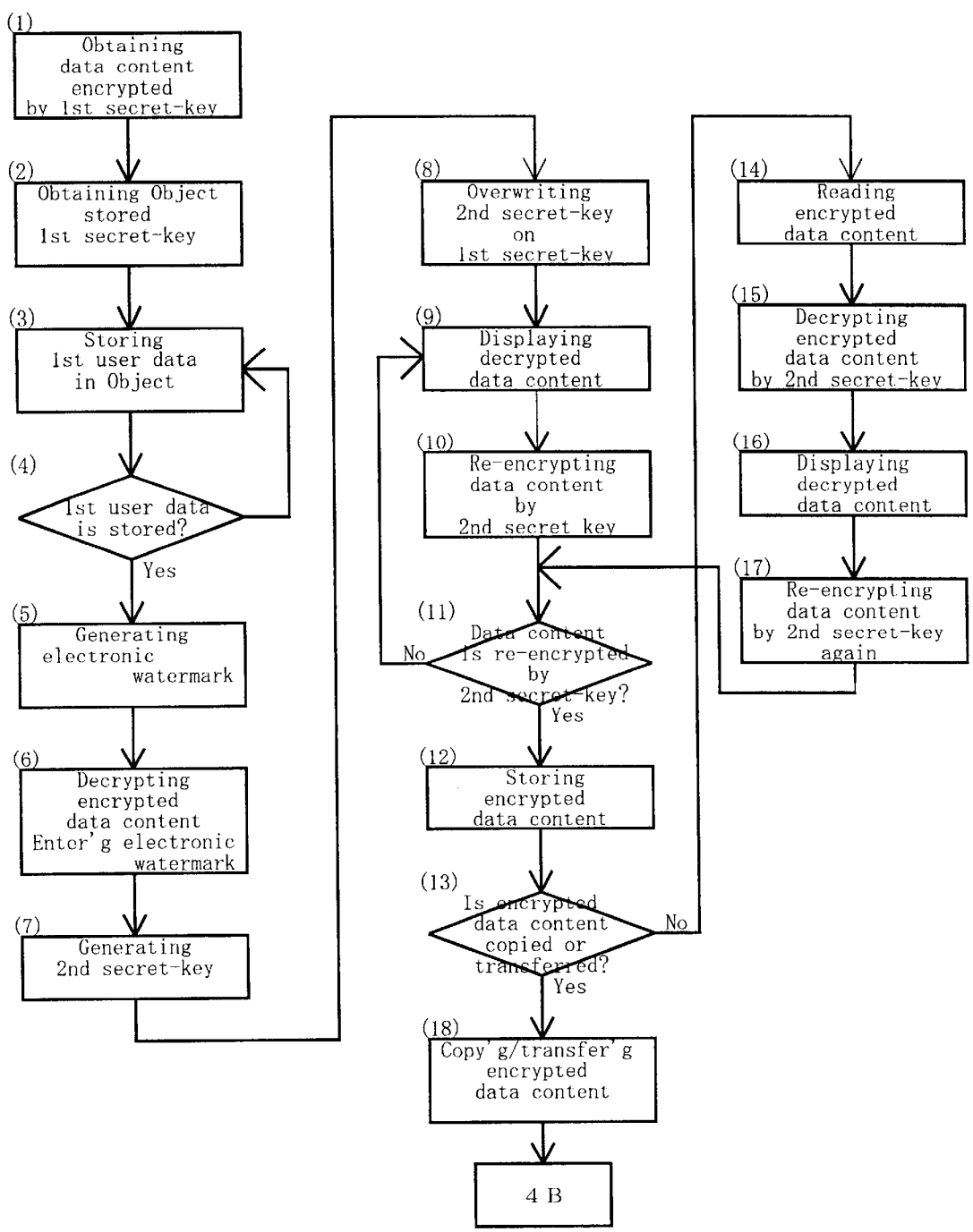
FIG. 4A represents a flow chart of processing performed on a first user side in the data management system of a fourth embodiment of the present invention.
Figure 4B:
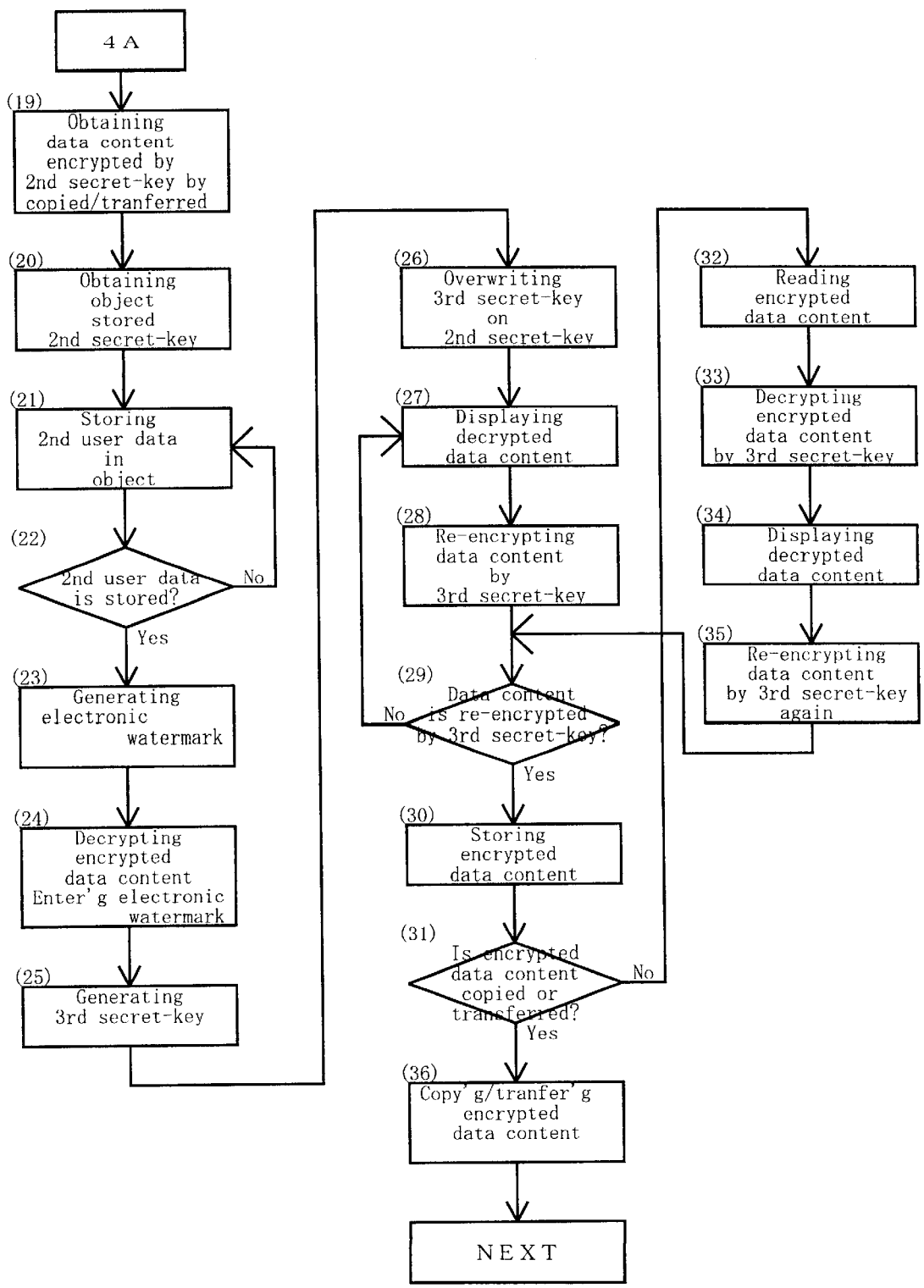
FIG. 4B represents a flow chart of processing performed on a second user side in the data management system of a fourth embodiment of the present invention.

Description is given now on the fourth embodiment of the invention referring to FIG. 4A and FIG. 4B.

Unlike the first to the third embodiments, which relate to the data management system as a whole, the fourth embodiment is directed to data management operation on the user side. The flow chart shown in FIG. 4A represents an example of operation performed on a first user side, and the flow chart shown in FIG. 4B represents an example of operation on a second user side.

In this embodiment, the data management program is arranged as an object program, and the user data and the secret-key are stored as instance variables in the slot of the object.

(1) The first user U1 obtains an encrypted data content Cm0ks1 which is obtained through encrypting the data content M0 using a first secret-key Ks1. The encrypted data content can be obtained via a network, by data broadcasting, or via a recording medium.

(2) When the encrypted data content Cm0ks1 is obtained, the first user U1 obtains the data management program object where first secret-key Ks1 is stored in the slot as instance variable, from the data management center. The data management program object may be provided via the network, but it is desirable to supply it by storing in an IC card or the like for security purpose.

(3) The first user data I1 is stored as instance variable in the slot of the data management program object.

(4) It is confirmed that the first user data I1 has been stored in the data management program object.

If not stored, the procedure of (3) above to store the first user data I1 to the data management program object is repeated.

(5) A pattern of electronic watermark W1 is generated based on the first user data I1 by the data management program.

(6) The first user U1 decrypts the encrypted data content Cm0ks1 using the first secret-key Ks1:

$$M0=D(Cm0ks1, Ks1).$$

The decrypted data content M0 is edited by promptly entering the electronic watermark W1, and the data content M0 is edited to a data content M1.

(7) A second secret-key is generated by the data management program.

(8) By overwriting the generated second secret-key on the first secret-key, the first secret-key Ks1 is abandoned, and the second secret-key Ks2 is stored.

(9) After the above procedure has been completed, the data content M1 is utilized.

The data content to be utilized is not the data content M0 obtained from the data management center, but it is the data content M1 where the user data I1 of the first user U1 is entered as electronic watermark. However, the electronic watermark gives no change to external appearance, and it can be used without any trouble.

(10) When the data content M1 used by the first user U1 is to be stored in the storage unit, the data content M1 is first encrypted using the second secret-key Ks2 by the data management program:

$$Cm1ks2=E(M1, Ks2).$$

(11) Then, it is confirmed whether the data content M1 to be stored has been turned to the encrypted data content Cm1ks2 or not. In case it is not encrypted, the data content is not stored, and it goes back to the step in (9) above.

(12) When it is confirmed that the data content to be stored is the encrypted data content Cm1ks2, the encrypted data content Cm1ks2 is stored in the storage unit.

(13) In case the first user U1 re-uses the encrypted data content Cm1ks2 without copying and transferring to the second user U2,

(14) the encrypted data content Cm1ks2 stored in the storage unit is read,
(15) the encrypted data content Cm1ks2 is decrypted using the second secret-key Ks2 by the data management program:

$$M1=D(Cm1ks2, Ks2), \text{ and}$$

(16) the decrypted data content M1 is used.
(17) When the first user U1 stores the re-used data content M1 to the storage unit, the data content M1 is first re-encrypted using the second secret-key Ks2 by the data management program and is stored.
(18) In case the first user U1 copies and transfers the encrypted data content Cm1ks2 to the second user U2, the encrypted data content Cm1ks2 is transferred by copying it on a recording medium or via the network.
(19) The second user U2 obtains the encrypted data content Cm1ks2 via the network or via the recording medium.
(20) When the encrypted data content Cm1ks2 is obtained, the second user U2 obtains the data management program object where the second secret-key Ks2 is stored in the slot as instance variable, from the data management center. The data management program object may be provided via the network but it is desirable to supply it by storing in an IC card or the like for security purpose.
(21) The second user data I2 is stored as instance variable in the slot of the data management program object.
(22) It is confirmed that the second user data I2 has been stored in the data management program object.

If not stored, the procedure in (21) above to store the second user data I2 to the data management program object is repeated.

(23) By the data management program, a pattern of electronic watermark W2 based on the second user data I2 is generated.
(24) The second user U2 decrypts the encrypted data content Cm1ks2 using the second secret-key Ks2:

$$M1=D(Cm1ks2, Ks2).$$

The decrypted data content M1 is edited by promptly entering the electronic watermark W2, and the data content M1 is edited to a data content M2.
(25) A third secret-key is generated by the data management program.
(26) By overwriting the generated third secret-key on the second secret-key, the second secret-key Ks2 is abandoned, and the third secret-key Ks3 is stored.
(27) After the above procedure has been completed, the data content M2 is utilized.

The data content to be utilized is not the data content M0 obtained from the data management center, but it is the data content M2 where the data I2 of the second user U2 is entered as electronic watermark. However, the electronic watermark gives no change to external appearance, and it can be used without any trouble.

By overwriting the electronic watermark W2 on the electronic watermark W1, such as only W2 is entered in the data content M2, it is possible to design in such a manner that a single electronic watermark is entered at all times and it is only the electronic watermark of the final user data. Or else, such as the electronic watermark W2 may be written at the same time without overwriting on the electronic watermark W1 in the data content M2, it is also possible that the electronic watermarks entered increase and these are the electronic watermarks of all of the user data.
(28) When the data content M2 used by the second user U2 is to be stored in the storage unit, the data content M2 is first encrypted using the third secret-key Ks3 by the data management program:

$$Cm2ks3=E(M2, Ks3).$$

(29) Then, it is confirmed whether the data content M2 to be stored has been turned to the encrypted data content Cm2ks3 or not. If it is not encrypted, the data content is not stored, and it goes back to the step of (27).
(30) When it is confirmed that the data content to be stored is the encrypted data content Cm2ks3, the encrypted data content Cm2ks3 is stored in the storage unit.
(31) In case the second user U2 re-uses the encrypted data content Cm2ks3 without copying and transferring it to the third user U3,
(32) the encrypted data content Cm2ks3 stored in the storage unit is read,
(33) the encrypted data content Cm2ks3 is decrypted using the third secret-key Ks3 by the data management program:

$$M2=D(Cm2ks3, Ks3), \text{ and}$$

(34) the decrypted data content M2 is utilized.
(35) When the second user U2 stores the re-used data content M2 in the storage unit, the data content M2 is first re-encrypted by the data management program using the third secret-key Ks3 and is stored.
(36) In case the second user U2 copies and transfers the encrypted data content Cm2ks3 to the third user U3, the encrypted data content Cm2ks3 is copied on a recording medium or is provided via the network.

Then, the same procedure is repeated.

The first to the fourth embodiments as described above represent the cases where illegitimate use of the data under control of the data management center is prevented, i.e. a charged key is used for a charged data.

However, in the arrangement as described above, by replacing the data management center with a host of video conference, the first user with a guest of video conference, and the second and the subsequent users with observers of video conference, it is possible in the application for a video conference system to prevent leakage of the content of the conference.

Similarly, in the application for a digital cash system, by replacing the data management center with a client side bank, the first user with a client, and the second user with a shop, it is possible to improve security in the digital cash system.

In the system as described above, each of the users to utilize the system must be registered at the data management center in advance. At the time of registration, data management program is provided to the users.

In the present invention to utilize the data M, the first secret-key Ks1, the second secret-key Ks2 and the data management program are transferred to each user, and each user must store them.

As the place to store them, it is ideal to use an IC card now being propagated; in which an IC element is encapsulated in a card-like container, or in particular, to use a PC card where microprocessor is encapsulated.

Also, it is possible to design in such a manner that the data management program serves as an agent on the data management center side so that utilization status, transfer status, etc. of the data content are automatically reported when the user sends a request to use to the data management center.

It is understood that particular embodiments described herein are illustrative and the present invention is not limited to these particular embodiments. It will be apparent to those skilled in the art that changes can be made in the various details described herein without departing from the scope of the invention. The present invention is defined by the claims and their full scope of equivalents.

I claim:

1. A data management method comprising:
   entering first user data as a first electronic watermark to first data content by a data management center;
   encrypting the first data content by the data management center using a first secret key;
   distributing the encrypted first data content from the data management center to a first user;
   distributing the first secret key and a second secret key from the data management center to the first user, the first and second secret keys being different from each other;
   decrypting the encrypted first data content by the first user using the first secret key;
   entering second user data as a second electronic watermark to the first data content by the first user before transferring the first data content from the first user to a second user; and
   re-encrypting the first data content by the first user using the second secret key before storing, copying, or transferring the first data content by the first user.

2. A data management method according to claim 1, further comprising:
   encrypting the first and second secret keys by the data management center using a public key of the first user before distributing the first and second secret keys to the first user; and
   decrypting the first and second secret keys by the first user using a private key of the first user before decrypting the encrypted first data content using the first secret key.

3. A data management method according to claim 1, wherein the secret keys are generated by the data management center.

4. A data management method according to claim 1, wherein the first and second secret keys are generated by the data management center based on the first user data.

5. A data management method according to claim 1, wherein the secret keys are selected by the data management center from a key library at the data management center.

6. A data management method according to claim 1,
   wherein each of the secret keys is divided into corresponding partial secret keys,
   wherein one of the partial secret keys corresponding to the first secret key and one of the partial secret keys corresponding to the second secret key are distributed to the first user,
   wherein another one of the partial secret keys corresponding to the first secret key and another one of the partial secret keys corresponding to the second secret key are attached to the first data content.

7. A data management method according to claim 1, wherein after said decrypting by the first user using the first secret key, the first secret key is abandoned by the first user by overwriting the first secret key with the second secret key.

8. A data management method according to claim 1, wherein the secret keys are stored at the data management center to provide a key escrow system by the data management center.

9. A data management method according to claim 1, wherein the secret keys are stored at the data management center to provide a key recovery system by the data management center.

10. A data management method according to claim 1, further comprising:
    editing the first data content by the first user to produce edited data content represented by the first data content and a scenario, the scenario being an editing process on the first data content;
    registering the scenario with the data management center;
    distributing a third secret key from the data management center to the first user upon registration of the scenario, the third secret key being different from the first and second secret keys; and
    encrypting the edited data content by the first user using the third secret key before storing, copying, or transferring the edited data content by the first user.

11. A data management method comprising:
    entering first user data as a first electronic watermark to first data content by a data management center;
    encrypting the first data content by the data management center using a first secret key;
    distributing the encrypted first data content from the data management center to a first user;
    distributing the first secret key and a second secret key from the data management center to the first user, the first and second secret keys being different from each other;
    decrypting the encrypted first data content by the first user using the first secret key;
    entering second user data as a second electronic watermark to the first data content by the first user before transferring the first data content from the first user to a second user;
    re-encrypting the first data content by the first user using the second secret key before storing, copying, or transferring the first data content by the first user;
    requesting the data management center for access to the re-encrypted first data content by the second user;
    distributing the second secret key and a third secret key to the second user, the second and third secret keys being different from each other;
    decrypting the re-encrypted first data content by the second user using the second secret key; and
    re-encrypting the decrypted first data content by the second user using the third secret key before storing, copying, or transferring the first data content by the second user.

12. A data management method according to claim 11, further comprising:
    encrypting the first and second secret keys by the data management center using a public key of the first user before distributing the first and second secret keys to the first user;
    decrypting the first and second secret keys by the first user using a private key of the first user before decrypting the encrypted first data content using the first secret key;
    encrypting the second and third secret keys by the data management center using a public key of the second user before distributing the second and third secret keys to the second user; and
    decrypting the second and third secret keys by the second user using a private key of the second user before decrypting the re-encrypted first data content using the second secret key.

13. A data management method according to claim 11, wherein the secret keys are generated by the data management center.

14. A data management method according to claim 11, wherein the first and second secret keys are generated by the data management center based on the first user data, and the third secret key is generated by the data management center based on the second user data.

15. A data management method according to claim 11, wherein the secret keys are selected by the data management center from a key library at the data management center.

16. A data management method according to claim 11,
wherein each of the secret keys is divided into corresponding partial secret keys,
wherein one of the partial secret keys corresponding to the first secret key and one of the partial secret keys corresponding to the second secret key are distributed to the first user,
wherein another one of the partial secret keys corresponding to the first secret key and another one of the partial secret keys corresponding to the second secret key are attached to the first data content.

17. A data management method according to claim 11,
wherein after said decrypting by the first user using the first secret key, the first secret key is abandoned by the first user by overwriting the first secret key with the second secret key, and
wherein after said decrypting by the second user using the second secret key, the second secret key is abandoned by the second user by overwriting the second secret key with the third secret key.

18. A data management method according to claim 11, wherein the secret keys are stored at the data management center to provide a key escrow system by the data management center.

19. A data management method according to claim 11, wherein the secret keys are stored at the data management center to provide a key recovery system by the data management center.

20. A data management method comprising:
entering first user data as a first electronic watermark to first data content by a data management center;
encrypting the first data content by the data management center using a first secret key;
distributing the encrypted first data content from the data management center to a first user;
distributing the first secret key and a second secret key from the data management center to the first user, the first and second secret keys being different from each other;
decrypting the encrypted first data content by the first user using the first secret key;
editing the first data content by the first user to produce edited data content;
entering second user data as a second electronic watermark to the edited data content by the first user before transferring the edited data content from the first user to a second user; and
re-encrypting the first data content by the first user using the second secret key before storing, copying, or transferring the first data content by the first user.

21. A data management method according to claim 20, further comprising:

encrypting the first and second secret keys by the data management center using a public key of the first user before distributing the first and second secret keys to the first user; and
decrypting the first and second secret keys by the first user using a private key of the first user before decrypting the encrypted first data content using the first secret key.

22. A data management method according to claim 20, wherein the secret keys are generated by the data management center.

23. A data management method according to claim 20, wherein the first and second secret keys are generated by the data management center based on the first user data.

24. A data management method according to claim 20, wherein the secret keys are selected by the data management center from a key library at the data management center.

25. A data management method according to claim 20,
wherein each of the secret keys is divided into corresponding partial secret keys,
wherein one of the partial secret keys corresponding to the first secret key and one of the partial secret keys corresponding to the second secret key are distributed to the first user,
wherein another one of the partial secret keys corresponding to the first secret key and another one of the partial secret keys corresponding to the second secret key are attached to the first data content.

26. A data management method according to claim 20,
wherein after said decrypting by the first user using the first secret key, the first secret key is abandoned by the first user by overwriting the first secret key with the second secret key.

27. A data management method according to claim 20, wherein the secret keys are stored at the data management center to provide a key escrow system by the data management center.

28. A data management method according to claim 20, wherein the secret keys are stored at the data management center to provide a key recovery system by the data management center.

29. A data management method according to claim 20, further comprising:
registering a scenario with the data management center, the scenario being an editing process on the first data content generated by said editing of the first data content;
distributing a third secret key from the data management center to the first user upon registration of the scenario, the third secret key being different from the first and second secret keys; and
encrypting the edited data content by the first user using the third secret key before storing, copying, or transferring the edited data content by the first user.

30. A data management method comprising:
entering first user data as a first electronic watermark to first data content by a data management center;
encrypting the first data content by the data management center using a first secret key;
distributing the encrypted first data content from the data management center to a first user;
distributing the first secret key and a second secret key from the data management center to the first user, the first and second secret keys being different from each other;

decrypting the encrypted first data content by the first user using the first secret key;

editing the first data content by the first user to produce edited data content;

entering second user data as a second electronic watermark to the edited data content by the first user before transferring the edited data content from the first user to a second user encrypting the edited data content by the first user using the second secret key before storing, copying, or transferring the edited data content by the first user;

requesting the data management center for access to the encrypted edited data content by the second user;

distributing the second secret key and a third secret key from the data management center to the second user, the second and third secret keys being different from each other;

decrypting the encrypted edited data content by the second user using the second secret key; and re-encrypting the edited data content by the second user using the third secret key before storing, copying, or transferring the edited data content by the second user.

31. A data management method according to claim 30, further comprising:

encrypting the first and second secret keys by the data management center using a public key of the first user before distributing the first and second secret keys to the first user;

decrypting the first and second secret keys by the first user using a private key of the first user before decrypting the encrypted first data content using the first secret key;

encrypting the second and third secret keys by the data management center using a public key of the second user before distributing the second and third secret keys to the second user; and decrypting the second and third secret keys by the second user using a private key of the second user before decrypting the encrypted edited data content using the second secret key.

32. A data management method according to claim 30, wherein the secret keys are generated by the data management center.

33. A data management method according to claim 30, wherein the first and second secret keys are generated by the data management center based on the first user data, and the third secret key is generated by the data management center based on the second user data.

34. A data management method according to claim 30, wherein the secret keys are selected by the data management center from a key library at the data management center.

35. A data management method according to claim 30, wherein each of the secret keys is divided into corresponding partial secret keys, wherein one of the partial secret keys corresponding to the first secret key and one of the partial secret keys corresponding to the second secret key are distributed to the first user, wherein another one of the partial secret keys corresponding to the first secret key and another one of the partial secret keys corresponding to the second secret key are attached to the first data content.

36. A data management method according to claim 30, wherein after said decrypting by the first user using the first secret key, the first secret key is abandoned by the first user by overwriting the first secret key with the second secret key, and wherein after said decrypting by the second user using the second secret key, the second secret key is abandoned by the second user by overwriting the second secret key with the third secret key.

37. A data management method according to claim 30, wherein the secret keys are stored at the data management center to provide a key escrow system by the data management center.

38. A data management method according to claim 30, wherein the secret keys are stored at the data management center to provide a key recovery system by the data management center.

39. A data management method comprising:

entering first user data as a first electronic watermark to first data content by a data management center;

encrypting the first data content by the data management center using a first secret key;

distributing the encrypted first data content from the data management center to a first user;

distributing the first secret key and a second secret key from the data management center to the first user, the first and second secret keys being different from each other;

decrypting the encrypted first data content by the first user using the first secret key;

editing the first data content by the first user to produce edited data content;

registering a scenario with the data management center, the scenario being an editing process on the first data content generated by said editing of the first data content;

entering second user data as a second electronic watermark to the edited data content by the first user before transferring the edited data content from the first user to a second user;

distributing a third secret key from the data management center to the first user upon registration of the scenario, the third secret key being different from the first and second secret keys;

encrypting the edited data content by the first user using the third secret key before storing, copying, or transferring the edited data content by the first user;

re-encrypting the first data content by the first user using the second secret key before storing, copying, or transferring the first data content by the first user;

requesting the data management center for access to the encrypted edited data content by the second user;

distributing the third secret key and a fourth secret key to the second user, the third and fourth secret keys being different from each other;

decrypting the encrypted edited data content by the second user using the third secret key; and re-encrypting the edited data content by the second user using the fourth secret key before storing, copying, or transferring the edited data content by the second user.

40. A data management method according to claim 39, further comprising:

encrypting the first and second secret keys by the data management center using a public key of the first user before distributing the first and second secret keys to the first user;

decrypting the first and second secret keys by the first user using a private key of the first user before decrypting the encrypted first data content using the first secret key;

encrypting the third secret key by the data management center using the public key of the first user before distributing the third secret key to the first user;

decrypting the third secret key by the first user using the private key of the first user before encrypting edited data content using the third secret key;

encrypting the third and fourth secret keys by the data management center using a public key of the second user before distributing the third and fourth secret keys to the second user; and decrypting the third and fourth secret keys by the second user using a private key of the second user before decrypting the encrypted edited data content using the third secret key.

41. A data management method according to claim 39, wherein the secret keys are generated by the data management center.

42. A data management method according to claim 39, wherein the first, second, and third secret keys are generated by the key center based on the first user data, and the fourth secret key is generated by the key center based on the second user data.

43. A data management method according to claim 39, wherein the secret keys are selected by the data management center from a key library at the data management center.

44. A data management method according to claim 39,
wherein each of the secret keys is divided into corresponding partial secret keys,
wherein one of the partial secret keys corresponding to the first secret key and one of the partial secret keys corresponding to the second secret key are distributed to the first user,
wherein another one of the partial secret keys corresponding to the first secret key and another one of the partial secret keys corresponding to the second secret key are attached to the first data content.

45. A data management method according to claim 39,
wherein after said decrypting by the first user using the first secret key, the first secret key is abandoned by the first user by overwriting the first secret key with the second secret key, and
wherein after said decrypting by the second user using the third secret key, the third secret key is abandoned by the second user by overwriting the third secret key with the fourth secret key.

46. A data management method according to claim 39, wherein the secret keys are stored at the data management center to provide a key escrow system by the data management center.

47. A data management method according to claim 39, wherein the secret keys are stored at the data management center to provide a key recovery system by the data management center.

48. A data management method comprising:
entering first user data as a first electronic watermark to first data content by a data center;
encrypting the first data content by the data center using a first secret key provided by a key center;
distributing the encrypted first data content from the data center to a first user;
distributing the first secret key and a second secret key from the key center to the first user, the first and second secret keys being different from each other;
decrypting the encrypted first data content by the first user using the first secret key;

entering second user data as a second electronic watermark to the first data content by the first user before transferring the first data content from the first user to a second user; and re-encrypting the first data content by the first user using the second secret key before storing, copying, or transferring the first data content by the first user.

49. A data management method according to claim 48, further comprising:
encrypting the first and second secret keys by the key center using a public key of the first user before distributing the first and second secret keys to the first user; and
decrypting the first and second secret keys by the first user using a private key of the first user before decrypting the encrypted first data content using the first secret key.

50. A data management method according to claim 48, wherein the secret keys are generated by the key center.

51. A data management method according to claim 48, wherein the first and second secret keys are generated by the key center based on the first user data.

52. A data management method according to claim 48, wherein the secret keys are selected by the key center from a key library at the key center.

53. A data management method according to claim 48,
wherein each of the secret keys is divided into corresponding partial secret keys,
wherein one of the partial secret keys corresponding to the first secret key and one of the partial secret keys corresponding to the second secret key are distributed to the first user,
wherein another one of the partial secret keys corresponding to the first secret key and another one of the partial secret keys corresponding to the second secret key are attached to the first data content.

54. A data management method according to claim 48,
wherein after said decrypting by the first user using the first secret key, the first secret key is abandoned by the first user by overwriting the first secret key with the second secret key.

55. A data management method according to claim 48, wherein the secret keys are stored at the key center to provide a key escrow system by the key center.

56. A data management method according to claim 48, wherein the secret keys are stored at the key center to provide a key recovery system by the key center.

57. A data management method according to claim 48, further comprising:
editing the first data content by the first user to produce edited data content represented by the first data content and a scenario, the scenario being an editing process on the first data content;
registering the scenario with the key center;
distributing a third secret key from the key center to the first user upon registration of the scenario, the third secret key being different from the first and second secret keys; and
encrypting the edited data content by the first user using the third secret key before storing, copying, or transferring the edited data content by the first user.

58. A data management method comprising:
entering first user data as a first electronic watermark to first data content by a data center;
encrypting the first data content by the data center using a first secret key provided by a key center;

distributing the encrypted first data content from the data center to a first user;

distributing the first secret key and a second secret key from the key center to the first user, the first and second secret keys being different from each other;

decrypting the encrypted first data content by the first user using the first secret key;

entering second user data as a second electronic watermark to the first data content by the first user before transferring the first data content from the first user to a second user;

re-encrypting the first data content by the first user using the second secret key before storing, copying, or transferring the first data content by the first user;

requesting the key center for access to the re-encrypted first data content by the second user;

distributing the second secret key and a third secret key from the key center to the second user, the second and third secret keys being different from each other;

decrypting the re-encrypted first data content by the second user using the second secret key; and re-encrypting the decrypted first data content by the second user using the third secret key before storing, copying, or transferring the first data content by the second user.

59. A data management method according to claim 58, further comprising:

encrypting the first and second secret keys by the key center using a public key of the first user before distributing the first and second secret keys to the first user;

decrypting the first and second secret keys by the first user using a private key of the first user before decrypting the encrypted first data content using the first secret key;

encrypting the second and third secret keys by the key center using a public key of the second user before distributing the second and third secret keys to the second user; and decrypting the second and third secret keys by the second user using a private key of the second user before decrypting the re-encrypted first data content using the second secret key.

60. A data management method according to claim 58, wherein the secret keys are generated by the key center.

61. A data management method according to claim 58, wherein the first and second secret keys are generated by the key center based on the first user data, and the third secret key is generated by the key center based on the second user data.

62. A data management method according to claim 58, wherein the secret keys are selected by the key center from a key library at the key center.

63. A data management method according to claim 58,
wherein each of the secret keys is divided into corresponding partial secret keys,
wherein one of the partial secret keys corresponding to the first secret key and one of the partial secret keys corresponding to the second secret key are distributed to the first user,
wherein another one of the partial secret keys corresponding to the first secret key and another one of the partial secret keys corresponding to the second secret key are attached to the first data content.

64. A data management method according to claim 58,
wherein after said decrypting by the first user using the first secret key, the first secret key is abandoned by the first user by overwriting the first secret key with the second secret key, and
wherein after said decrypting by the second user using the second secret key, the second secret key is abandoned by the second user by overwriting the second secret key with the third secret key.

65. A data management method according to claim 58, wherein the secret keys are stored at the key center to provide a key escrow system by the key center.

66. A data management method according to claim 58, wherein the secret keys are stored at the key center to provide a key recovery system by the key center.

67. A data management method comprising:

entering first user data as a first electronic watermark to first data content by a data center;

encrypting the first data content by the data center using a first secret key provided by a key center;

distributing the encrypted first data content from the data center to a first user;

distributing the first secret key and a second secret key from the key center to the first user, the first and second secret keys being different from each other;

decrypting the encrypted first data content by the first user using the first secret key;

editing the first data content by the first user to produce edited data content;

entering second user data as a second electronic watermark to the edited data content by the first user before transferring the edited data content from the first user to a second user; and re-encrypting the first data content by the first user using the second secret key before storing, copying, or transferring the first data content by the first user.

68. A data management method according to claim 67, further comprising:

encrypting the first and second secret keys by the key center using a public key of the first user before distributing the first and second secret keys to the first user; and decrypting the first and second secret keys by the first user using a private key of the first user before decrypting the encrypted first data content using the first secret key.

69. A data management method according to claim 67, wherein the secret keys are generated by the key center.

70. A data management method according to claim 67, wherein the first and second secret keys are generated by the key center based on the first user data.

71. A data management method according to claim 67, wherein the secret keys are selected by the key center from a key library at the key center.

72. A data management method according to claim 67,
wherein each of the secret keys is divided into corresponding partial secret keys,
wherein one of the partial secret keys corresponding to the first secret key and one of the partial secret keys corresponding to the second secret key are distributed to the first user,
wherein another one of the partial secret keys corresponding to the first secret key and another one of the partial secret keys corresponding to the second secret key are attached to the first data content.

73. A data management method according to claim 67, wherein after said decrypting by the first user using the first secret key, the first secret key is abandoned by the first user by overwriting the first secret key with the second secret key.

74. A data management method according to claim 67, wherein the secret keys are stored at the key center to provide a key escrow system by the key center.

75. A data management method according to claim 67, wherein the secret keys are stored at the key center to provide a key recovery system by the key center.

76. A data management method according to claim 67, further comprising:

registering a scenario with the key center, the scenario being an editing process on the first data content generated by said editing of the first data content;

distributing a third secret key from the key center to the first user upon registration of the scenario, the third secret key being different from the first and second secret keys; and encrypting the edited data content by the first user using the third secret key before storing, copying, or transferring the edited data content by the first user.

77. A data management method comprising:

entering first user data as a first electronic watermark to first data content by a data center;

encrypting the first data content by the data center using a first secret key provided by a key center;

distributing the first data content from the data center to a first user;

distributing the first secret key and a second secret key from the key center to the first user, the first and second secret keys being different from each other;

decrypting the encrypted first data content by the first user using the first secret key;

editing the first data content by the first user to produce edited data content;

entering second user data as a second electronic watermark to the edited data content by the first user before transferring the edited data content from the first user to a second user;

encrypting the edited data content by the first user using the second secret key before storing, copying, or transferring the edited data content by the first user;

requesting the key center for access to the encrypted edited data content by the second user;

distributing the second secret key and a third secret key from the key center to the second user, the second and third secret keys being different from each other;

decrypting the encrypted edited data content by the second user using the second secret key; and re-encrypting the edited data content by the second user using the third secret key before storing, copying, or transferring the edited data content by the second user.

78. A data management method according to claim 77, further comprising:

encrypting the first and second secret keys by the key center using a public key of the first user before distributing the first and second secret keys to the first user;

decrypting the first and second secret keys by the first user using a private key of the first user before decrypting the encrypted first data content using the first secret key;

encrypting the second and third secret keys by the key center using a public key of the second user before distributing the second and third secret keys to the second user; and decrypting the second and third secret keys by the second user using a private key of the second user before decrypting the encrypted edited data content using the second secret key.

79. A data management method according to claim 77, wherein the secret keys are generated by the key center.

80. A data management method according to claim 77, wherein the first and second secret keys are generated by the key center based on the first user data, and the third secret key is generated by the key center based on the second user data.

81. A data management method according to claim 77, wherein the secret keys are selected by the key center from a key library at the key center.

82. A data management method according to claim 77, wherein each of the secret keys is divided into corresponding partial secret keys, wherein one of the partial secret keys corresponding to the first secret key and one of the partial secret keys corresponding to the second secret key are distributed to the first user, wherein another one of the partial secret keys corresponding to the first secret key and another one of the partial secret keys corresponding to the second secret key are attached to the first data content.

83. A data management method according to claim 77, wherein after said decrypting by the first user using the first secret key, the first secret key is abandoned by the first user by overwriting the first secret key with the second secret key, and wherein after said decrypting by the second user using the second secret key, the second secret key is abandoned by the second user by overwriting the second secret key with the third secret key.

84. A data management method according to claim 77, wherein the secret keys are stored at the key center to provide a key escrow system by the key center.

85. A data management method according to claim 77, wherein the secret keys are stored at the key center to provide a key recovery system by the key center.

86. A data management method comprising:

entering first user data as a first electronic watermark to first data content by a data center;

encrypting the first data content by the data center using a first secret key provided by a key center;

distributing the encrypted first data content from the data center to a first user;

distributing the first secret key and a second secret key from the key center to the first user, the first and second secret keys being different from each other;

decrypting the encrypted first data content by the first user using the first secret key;

editing the first data content by the first user to produce edited data content;

registering a scenario with the key center, the scenario being an editing process on the first data content generated by said editing of the first data content;

entering second user data as a second electronic watermark to the edited data content by the first user before transferring the edited data content from the first user to a second user;

distributing a third secret key from the key center to the first user upon registration of the scenario, the third secret key being different from the first and second secret keys;

encrypting the edited data content by the first user using the third secret key before storing, copying, or transferring the edited data content by the first user;

re-encrypting the first data content by the first user using the second secret key before storing, copying, or transferring the first data content by the first user;

requesting the key center for access to the encrypted edited data content by the second user;

distributing the third secret key and a fourth secret key from the key center to the second user, the third and fourth secret keys being different from each other;

decrypting the encrypted edited data content by the second user using the third secret key; and re-encrypting the edited data content by the second user using the fourth secret key before storing, copying, or transferring the edited data content by the second user.

87. A data management method according to claim 86, further comprising:

encrypting the first and second secret keys by the key center using a public key of the first user before distributing the first and second secret keys to the first user;

decrypting the first and second secret keys by the first user using a private key of the first user before decrypting the encrypted first data content using the first secret key;

encrypting the third secret key by the key center using the public key of the first user before distributing the third secret key to the first user;

decrypting the third secret key by the first user using the private key of the first user before encrypting edited data content using the third secret key;

encrypting the third and fourth secret keys by the key center using a public key of the second user before distributing the third and fourth secret keys to the second user; and decrypting the third and fourth secret keys by the second user using a private key of the second user before decrypting the encrypted edited data content using the third secret key.

88. A data management method according to claim 86, wherein the secret keys are generated by the key center.

89. A data management method according to claim 86, wherein the first, second, and third secret keys are generated by the key center based on the first user data, and the fourth secret key is generated by the key center based on the second user data.

90. A data management method according to claim 86, wherein the secret keys are selected by the key center from a key library at the key center.

91. A data management method according to claim 86,
wherein each of the secret keys is divided into corresponding partial secret keys,
wherein one of the partial secret keys corresponding to the first secret key and one of the partial secret keys corresponding to the second secret key are distributed to the first user,
wherein another one of the partial secret keys corresponding to the first secret key and another one of the partial secret keys corresponding to the second secret key are attached to the first data content.

92. A data management method according to claim 86,
wherein after said decrypting by the first user using the first secret key, the first secret key is abandoned by the first user by overwriting the first secret key with the second secret key, and
wherein after said decrypting by the second user using the third secret key, the third secret key is abandoned by the second user by overwriting the third secret key with the fourth secret key.

93. A data management method according to claim 86, wherein the secret keys are stored at the key center to provide a key escrow system by the key center.

94. A data management method according to claim 86, wherein the secret keys are stored at the key center to provide a key recovery system by the key center.

* * * * *